United States Patent
Fujiwara et al.

(10) Patent No.: US 6,751,179 B2
(45) Date of Patent: *Jun. 15, 2004

(54) DISK UNIT WITH ROLLERS

(75) Inventors: Tatsunori Fujiwara, Tokyo (JP); Kazutoshi Taniguchi, Tokyo (JP); Shigeki Asai, Tokyo (JP); Takaharu Eguchi, Tokyo (JP); Takao Morimoto, Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/403,286

(22) PCT Filed: Jun. 22, 1998

(86) PCT No.: PCT/JP98/02776

§ 371 (c)(1),
(2), (4) Date: Oct. 19, 1999

(87) PCT Pub. No.: WO99/67783

PCT Pub. Date: Dec. 29, 1999

(65) Prior Publication Data

US 2002/0041560 A1 Apr. 11, 2002

(51) Int. Cl.⁷ .............................................. G11B 17/04

(52) U.S. Cl. .................................................... 369/77.1
(58) Field of Search ........................... 369/99.01, 99.02, 369/99.03, 99.04, 99.05, 99.06, 99.07, 77.1, 75.1, 75.2, 77.2; 360/99.08, 99.09

(56) References Cited

U.S. PATENT DOCUMENTS

| 4,497,051 A | | 1/1985 | Takahashi et al. ......... 369/77.1 |
| 5,036,509 A | * | 7/1991 | Kobayashi et al. ........ 369/75.2 |
| 5,719,844 A | * | 2/1998 | Abe ........................... 369/77.1 |
| 5,872,756 A | * | 2/1999 | Shime ........................ 369/77.1 |
| 6,052,356 A | * | 4/2000 | Fujimoto et al. ........... 369/192 |
| 6,097,686 A | * | 8/2000 | Yan ............................ 369/75.2 |

FOREIGN PATENT DOCUMENTS

| JP | 6431544 | | 2/1989 |
| JP | 1-91361 | * | 4/1989 |
| JP | 596935 | | 12/1993 |
| JP | 5-96935 A | * | 12/1993 |

* cited by examiner

Primary Examiner—Tianjie Chen
(74) Attorney, Agent, or Firm—Birch, Stewart, Kolasch & Birch, LLP

(57) ABSTRACT

A supplementary roller is disposed on the end of a disk guiding section 71 so that the outer face 72c of the cylindrical shaped section 72b of the supplementary roller is placed on the conveying roller 73 side by the protruding section 71a formed on disk guiding section 71.

9 Claims, 28 Drawing Sheets

(A)

(B)

(A)

(B)

(A)

(B)

(C)

(A)

(B)

(A)

(B)

(A)　　　　　　　　(B)

DISK UNIT WITH ROLLERS

This application is the national phase under 35 U.S.C. §371 of POT International Application No. PCT/JP98/02776 which has an International filing date of Jun. 22, 1998, which designated the United States of America.

FIELD OF THE INVENTION

The present invention relates to a disk device comprising a conveying unit for conveying a disk inserted into the chassis from a disk insertion aperture to a playing unit, conveying the disk which has been conveyed by the conveying unit from the playing unit to the disk insertion aperture and expelling the disk to the outside of the chassis.

BACKGROUND ART

Firstly a disk device mounted in an automobile will be outlined. FIG. 1 is a schematic diagram showing a disk device for use in an automobile. In FIG. 1, 1 is a disk device, 2 is a chassis disposed in the interior of the automobile, 3 is a playing unit for rotating the disk D and reading information recorded on the disk D, 4 is a conveying unit which conveys a disk D inserted into the inner part of the chassis from the disk insertion aperture formed in the chassis to the playing unit 3, which then conveys a disk D which has been once conveyed to the playing unit 3 from the playing unit 3 to the disk insertion aperture and which expels the disk to the outside of the chassis 2. 5 is a flexible member such as an oil damper which prevents the transmission of automobile vibrations to the playing unit when the disk D is being played. The flexible member is provided between the lower face of the chassis 2 and the playing unit 3.

In the playing unit 3, 11 is a playing unit base storing the motor which displaces the motor or pickup which rotates the turntable. 11a is a rotation shaft of a pressure arm and is provided in the playing unit base 11. 12 is a turntable on which the disk D is mounted and which rotates the disk D. The turntable 12 is provided in the playing unit base 11. 13 is a pressure arm which rotates in the direction a–b about the rotation shaft 11a provided in the playing unit base 11. 14 is a disk gripping body which grips the disk D on the turntable 12 by rotating the pressure arm 13 towards the turntable side 12. The disk gripping body 14 is mounted on the pressure arm 13. 15 is a pickup which reads the information recorded on the disk D and which is provided on the playing unit base 11.

In the conveying unit 4, 21 is a disk guiding section which is fixed onto the upper plate of the chassis, 22 is a conveying roller which grips, with the guiding section, a disk D which is inserted into the interior of the chassis 2 from the disk insertion aperture. The conveying roller 22 then conveys the disk D to the playing unit 3 by rotating it in that state, grips the disk D which has been conveyed to the playing unit 3 with the disk guiding section 21, conveys the disk D to the insertion aperture by rotating it in that state and expels the disk D outside the chassis 2.

In FIG. 1, the cam plate is not shown. However it will be briefly explained as follows. The cam plate displaces the conveying roller provided on the conveying unit and the pressure arm provided on the playing unit and fixes and releases the playing unit 3 by sliding displacement in the direction of disk insertion and disk expulsion.

Next the operation of the invention will be explained.
At Time of Disk Insertion When a disk D is inserted into the interior of the chassis 2 from the disk insertion aperture, the disk D is tightly held by the disk guiding section 21 and the conveying roller 22. The disk D is conveyed to the playing unit by the rotations of the conveying roller 22. The disk D which has been conveyed to playing unit 3 is tightly held by the turntable 12 and the disk gripping body 14 due to the pressure arm rotating towards the turntable side 12 and so is mounted on the turntable 12. At this time the playing unit base 11 which had been fixed by the cam plate is released. The playing unit base 11 is supported by the flexible member 5, the information recorded in the disk D is read and in other words the disk D is placed in a playable state.

At Time of Disk Playing

When the disk is mounted on the turntable 12, is in a stationary position and the playing of the disk D commences, the disk D is rotated by the rotations of the turntable 12. The information contained in the disk D is read by the pickup 15. At this time, the vibrations of the automobile are absorbed by the flexible member 5 which prevents those vibrations from being transmitted to the playing unit 3.

At Time of Disk Expulsion

When the playing of the disk is finished, the disk D is held by the turntable 12 and the disk gripping body 14. When the disk D is in a stationary position and disk D expulsion commences, the pressure plate 13 rotates in the direction of separation from the turntable 12. As a result of these rotations, the disk D is lifted from the turntable 12 and held by the disk guiding section 21 and the conveying roller 22. The disk D is conveyed to the disk insertion aperture by the rotations of the conveying roller 22 and expelled to the outside of the chassis 2. At this time, the playing unit base 11 is fixed by the cam plate.

The disk device for use in an automobile has been explained in a simple way up until this point. Hereafter the constituent elements of the conventional disk device for use in an automobile will be explained in detail.

FIG. 2 is a figure showing the playing unit of a conventional disk device. FIG. 2 shows the playing unit as seen along the direction X of FIG. 1. FIG. 2 shows the initiation of disk insertion for a 12 cm disk. In FIG. 2, the 12 cm disk D is shown by the broken lines. FIG. 3 shows a disk stopper in a conventional disk device. FIG. 3 is a cross sectional view along the line I—I of FIG. 2. In FIGS. 2 and 3, 141 is a playing unit for reading the information recorded on the disk D. 143 is a flexible member such as an oil damper which prevents the transmission of automobile vibrations to the playing unit while the disk D is being played. 144a–144c are first to third positional determination shafts provided in the playing unit 141.

151 is a playing unit base which stores the motor or the like which displaces the pickup or the motor which rotates the turntable. 151d is a rotation shaft of the pressure arm and is provided on the playing unit base 151. 154 is a pressure arm which rotates about the rotation shaft 151d provided in the playing unit base 151. 155 is a disk gripping body which tightly holds the disk D on the turntable by rotating the pressure arm 154 to the turntable side and is mounted on the pressure arm 154.

161 is a disk stopper which is pushed by the disk D inserted in the interior of the chassis and displaces in direction B (the direction of disk insertion). 162 is a lever stopper which moves together with the displacement of the disk stopper 161 and rotates. The lever stopper 162 is provided on the upper surface of the pressure arm 154. 163 is a slide lock which rotates together with the rotations of the lever stopper 162, and which, when the disk D is not inserted in to the interior of the chassis, determines the position of the disk stopper 161 and which, when it rotates together with the rotations of the lever stopper 162, slidingly displaces the operational lever, discussed below, in direction A (the direction of disk expulsion). The side lock 163 is provided on the lower surface of the pressure arm 154. 165 is a support member for mounting the gripping body 155 on the pressure arm 154. 166 is a first spring connected to the lever stopper 162 and the slide lock 163. 167 is a second spring connected to the pressure arm 154 and the slide lock 163.

In the disk stopper 161, 161a is an abutting section onto which the disk inserted in the interior of the chassis abuts. 161b is an engaging member which engages with the guide hole formed in the pressure arm 154. 161c is an engaging pin which engages in the engaging hole formed in the lever stopper 162.

In the lever stopper 162, 162a is a rotation shaft of the lever stopper 162. 162b is a connecting section to which the first spring 166 is connected. 162c is an engaging hole with which the engaging pin 161c which is provided in the disk stopper 161 engages. 162d is a regulating hole which supports the regulating pin provided in the slide lock 163. 162e is a first regulating section forming the regulating hole 162d. 162f is a second regulating section forming the regulating hole 162d.

In the slide lock 163, 163a is a pressured section pressured by the front arm. 163b is a pressuring section which pressures the operational arm discussed hereafter. 163c is a regulating pin which is supported by the regulating hole 162d which is formed in the lever stopper 162. 163d is a connecting section which is connected to the first spring 166. 163e is a connecting section which is connected to the second spring 167. 163f is a slide hole which supports the rotation shaft 162a of the lever stopper 162.

In the pressure arm 154, 154a is a connecting section to which is connected the second spring 167. 154b is a guide hole which engages with the engaging section 161b provided on the disk stopper 162 and which pierces the guide hole 154b which guides the disk stopper 161 which is pressured by the disk D inserted into the interior of the chassis. The guide hole is formed along the conveying direction of the disk D in approximately the central section of the pressure arm 154. 154c is an engaging section insertion hole formed to engage the engaging section 161b provided on the disk stopper 161 with the guide hole 154b. 154d is a through hole formed to support the regulating pin 163c provided in the slide lock 163 with the regulating hole 162d formed in the lever stopper 162.

In the support member 165, 165a is a support section which supports the disk gripping body 155 while pressuring the upper center projection 155a of the disk gripping body 155. 165b is a covering section which covers the engaging section insertion hole 154c formed in the pressure arm 154.

In the conventional disk device, when the disk D is not inserted in the chassis interior, the position of the operational lever is fixed. As a result, the position of the slide lock 163 is determined. The position of the lever stopper 162 is determined due to the fact that the regulating pin 163c provided on the slide lock 163 is positioned on the first regulating section 162e which forms the regulating hole 162d which is formed in the lever stopper 162. Hence the position of the disk stopper 161 is determined. In the conventional disk device, when the disk D is not inserted in the interior of the chassis, the engaging section 161b provided in the disk stopper 161 is adapted so as not to abut with the support member 165.

FIG. 4 shows a conveying unit in a conventional disk device. FIG. 4 shows the conveying unit as seen from the direction Y in FIG. 1. FIG. 4 displays the situation when a 12 cm disk is being conveyed. In FIG. 4, the 12 cm disk is shown by the broken line. FIG. 5 shows the disk guiding section in a conventional disk device. FIG. 5 shows a disk guiding as seen from direction Z in FIG. 1. In FIGS. 4 and 5, 132 is a chassis disposed in the interior of an automobile and 133 is a disk insertion aperture formed in the front plate of the chassis 132.

171 is a disk guiding section fixed to the upper plate of the chassis 132. 173 is a conveying roller which conveys the disk D which has been inserted into the interior of the chassis 132 from the disk insertion aperture 133 to the playing unit by holding the disk against the disk guiding section 171 and rotating it in that state. It then holds the disk which has already been conveyed to the playing unit against the disk guiding section and rotates it in that state, conveys the disk to the disk insertion aperture 133 and expels the disk to the outside of the chassis 132. 174 is a conveying unit base.

In the disk guiding section 171, 171a is a protruding section which projects from the central section towards the periphery and approaches the conveying roller 173. The protruding section 171a is formed vertical to the direction in which the disk is being conveyed.

In the conveying roller 173, 173a is a shaft of the conveying roller 173 which is inserted into a round hole formed in the conveying unit base 74 so as to face the vertical direction to the direction in which the disk is conveyed. 173b is a rubber roller into which the shaft 173a of the conveying roller is loosely inserted and which increases in radius towards the end from the central section.

In this conventional disk device, when a disk D is conveyed, it is tightly held by the protruding section 171a formed on the disk guiding section 171 and the conveying roller 173.

FIG. 6 shows the camplate and related parts in the conventional disk device. FIG. 6(A) shows the camplate and related parts as seen from direction X in FIG. 1. FIG. 6(B) shows the cam plate and related parts as seen from direction P of FIG. 6(A). FIG. 6(C) is an enlarged view of the section Q encircled by the broken line in FIG. 6(B). FIG. 6 shows the disk in the early stages of being conveyed. FIG. 6 represents the right side plate of the chassis as being encircled by the wavy line b. In FIG. 6, 178 is a set of reduction gears which transmit the rotations of the motor to the conveying roller 173 in order to rotate the conveying roller and which is provided on the chassis 132.

181 is a camplate which slidingly displaces in the direction A–B and which, when it slidingly displaces in direction B, displaces the pressure arm in the direction in which the disk is not tightly held by the turntable and the disk gripping means. Then the cam plate displaces the conveying roller 173 in the direction in which the disk is held tightly by the disk guiding section and the conveying roller 173. When it slidingly displaces in direction A, it displaces the pressure arm in the direction in which the disk is held tightly by the turntable and the disk gripping body. The camplate displaces the conveying roller 173 in the direction in which the disk is not held tightly by the disk guiding section and the conveying roller 173. The camplate is provided between the right side plate of the chassis 132 and the playing unit. 182 is an operational lever which slidingly displaces in the direction A–B along the guide groove formed in the chassis 132. The camplate 181 is slidingly displaced in the direction A–B as a result of that displacement. The operational lever is provided on the camplate 181. 183 is a first linking member for securing the playing unit when the camplate 181 slidingly displaces and which is provided between the chassis 132 and the camplate 181. 184 is a fourth spring which connects the chassis 132 and the operational lever 182.

In the camplate 181, 181a is a slot which engages with a key shaped hook which is formed on the right side plate of the chassis 132 and which guides the camplate 181. 181b is a Z shaped hole which supports the displacement shaft 174c provided in the conveying unit base 174 and which guides the displacement shaft 174c together with the sliding displacement of the camplate 181. 181c is a horizontal hole which supports the first positional determination shaft 144a provided in the playing unit and guides the first positional determination shaft 144a together with the sliding displacement of the camplate 181. 181d is a horizontal groove which supports the second positional determination shaft 144b provided in the playing unit and which guides the second positional determination shaft 144b together with the sliding displacement of the camplate 181. 181e is a release hole which releases the support of the first positional determination shaft 144a due to the horizontal hole. 181f is a release groove which releases the support of the second positional determination shaft 144b due to the horizontal groove 181d. 181g is a rotation shaft of the first linking member 183 inserted into the round hole provided on the first linking member 183. 181h is an inclining section which abuts with the right side bent section 154e provided on the pressure arm 154 (refer to FIG. 2) and which slopes downwardly from direction A to direction B. 181i is an indented section formed on the top of the camplate 181. 181j is a through hole into which the reduction gears are arranged.

In the operational lever 182, 182a is a protruding section which is disposed in the indented section which is formed in the camplate 181 and which slidingly displaces the camplate 181 in the direction A–B together with the sliding displacement of the operational lever 182 by pushing the indenting section 181i. 182b is a rack which displaces the operational lever 182 by engaging with the gears of the reduction gears 178.

In the first linking member 183, 183a is a displacement shaft which is supported by the Z shaped hole formed in the right side plate of the chassis 132. 183b is a round hole into which the rotation shaft 181g of the first linking member 183 provided on the camplate 181 is inserted. 183c is a gripping member which grips the first positional determination shaft 144a which is provided in the playing unit when the camplate slidingly displaces in direction B.

In the right side plate of the chassis 132, 132d is a Z shaped hole which supports the displacement shaft 183a provided in the first linking member 183 and which guides the displacement shaft 183a together with the sliding displacement of the camplate 181. 188 is a first abutting section with which the indented section 181i formed in the camplate 181 and the protruding section 182a formed in the operational lever 182 abut when the operational lever 182 slidingly displaces in direction A. 189 is a second abutting section with which the indented section 181i formed in the camplate 181 and the protruding section 182a formed in the operational lever 182 abut when the operational lever 182 slidingly displaces in direction B.

In this disk device, the pressure arm rises and the disk is lifted from the turntable due to the fact that the bent section 154e on the right side face, which is provided on the pressure arm 154 rises along the inclined section 181h provided on the camplate 181, rises when the camplate 181 slidingly displaces in direction B. On the other hand, the pressure arm 154 lowers and the disk is mounted on the turntable due to the fact that bent section 154 on the right side lowers along the inclination of the inclined section 181h when the cam plate 181 slidingly displaces in direction A.

In this conventional disk device, when a disk is inserted, the operational lever 182 displaces in direction A and the rack 182b which is formed on the operational lever 182 engages with the gears of the reduction gears 178. Due to the motive force of the reduction gears, the operational lever 182 is slidingly displaced in direction A. The protruding section 182a formed on the operational lever 182 abuts with the indented section 181i formed on the camplate 181 in the first abutting section 187 and pressures the indented section 181i. As a result, the camplate 181 slidingly displaces in direction A together with the sliding displacement of the operational lever 182.

Furthermore in this conventional disk device, when the disk is expelled, the reduction gears 178 rotate in the inverse direction and the operational lever 182 slidingly displaces in direction B. The protruding section 182a formed on the operational lever 182 abuts with the indented section 181i formed on the camshaft 181 in the second abutting section 188 and pressures the indented section 181i. As a result, the camplate 181 slidingly displaces in direction B together with the sliding displacement of the operational lever 182. Due to the motive force of the reduction gears 178, the operational lever 182 slidingly displaces in direction B. The rack 182b formed on the operational lever 182 disengages from the reduction gears 178. Hence after the rack 182b formed on the operational lever 182 disengages from the reduction gears 178, the operational lever 182 is returned to its original position due to being pulled by the force of the fourth spring 184 in direction B. At this time, the protruding section 182a formed on the operational lever 182 pressures the indented section 181i formed on the camplate 181 and the camplate 181 too is returned to the original position.

FIG. 7 shows the playing unit base in a conventional disk device. FIG. 7(A) shows the playing unit base as seen from direction X in FIG. 1. FIG. 7(B) shows the playing unit base as seen from direction P in FIG. 7(A). FIG. 7 shows a 12 cm disk being raised from the turntable. In FIG. 7, the 12 cm disk is shown by the broken line. In FIG. 7, 151a is an inner lateral face which is a face opposite the disk insertion side of the playing unit base 151. 152 is a turntable on which a disk is disposed, which rotates the disk and which is provided on the playing unit base 151.

Since the conventional disk device is constructed as above, when the disk is conveyed, the disk is tightly held by the conveying roller and the protruding section formed on the disk guiding section. As a result, when the disk is conveyed, a large force is acting on the disk in the direction opposite to that in which the disk is being conveyed. Hence the problem arises that insertion or expulsion of disks becomes impossible.

The present invention is proposed to solve the above problems. It has the object of providing a disk device which can prevent the inconvenience of the insertion or expulsion of disks becoming impossible due to a large force acting on the disk in the direction opposite to that in which the disk is being conveyed when the disk is being conveyed.

DISCLOSURE OF THE INVENTION

The disk device of the present invention comprises a conveying unit which is provided with a supplementary roller provided with a rotation shaft and a rotation section. The rotation shaft is mounted on the disk guiding section so as to vertically face the direction in which the disk is being conveyed. The outer face of the rotation section is disposed on the end of the disk guiding section so as to be positioned on the conveying roller side by the protruding section formed on the disk guiding section.

In this way, when a disk is conveyed, since the force acting in the opposite direction to that in which the disk is being conveyed is reduced, it is possible to convey the disk smoothly and ensure the insertion and expulsion of disks. The disk device of the present invention has a disk guiding section which is provided with a blade spring section which pressures the rotation shaft of the supplementary roller in the axial direction.

In this way, the supplementary roller does not wobble and the generation of unwanted sounds can be prevented.

The disk device of the present invention has a supplementary roller which is disposed so that it approaches the conveying roller as the outer face of the rotation section goes from the center to the end.

In this way, when a disk is conveyed, damage to the information recorded on the disk surface is prevented as only the outer peripheral edge of the disk contacts with the supplementary roller.

PREFERRED EMBODIMENTS OF THE INVENTION

In order to explain the invention in more detail, the preferred embodiments of the present invention will be explained with reference to the accompanying figures.

Embodiment 1

Figure 8:
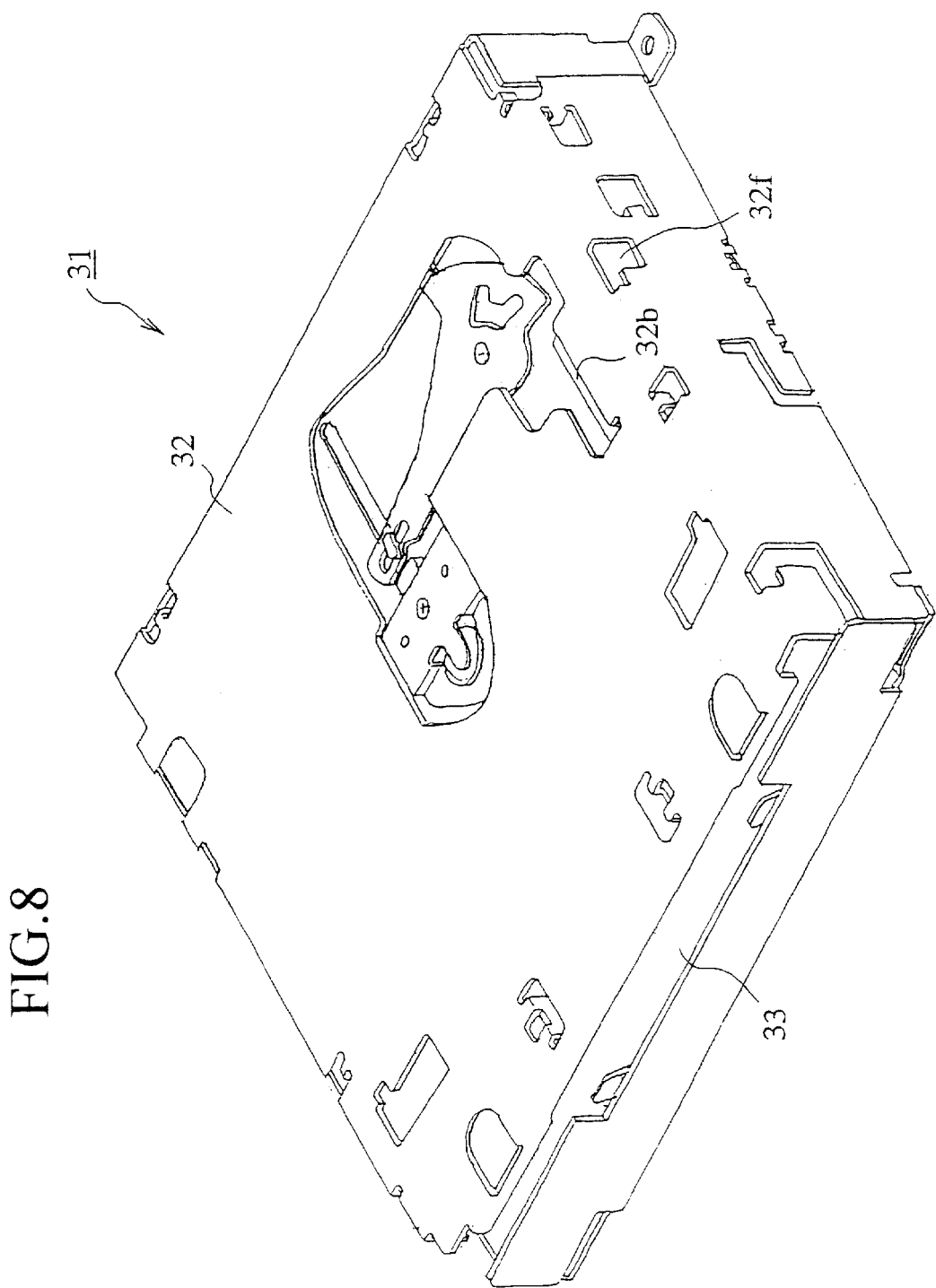
FIG. 8 is an inclined view which shows the outer view of a disk device according to a first embodiment of the present invention.

FIG. 8 is a perspective view of the outer surface of a disk device according to a first embodiment of the present invention. FIG. 8 shows the device in the state before the insertion of a disk or after the expulsion of a disk. In FIG. 8, 31 is a disk device, 32 is a chassis which is disposed in the interior of an automobile and 33 is a disk insertion aperture formed in the front plate of the chassis 32. In the interior of the chassis components such as the cam plate, conveying unit, playing unit, which will be explained later, are disposed.

Figure 1:
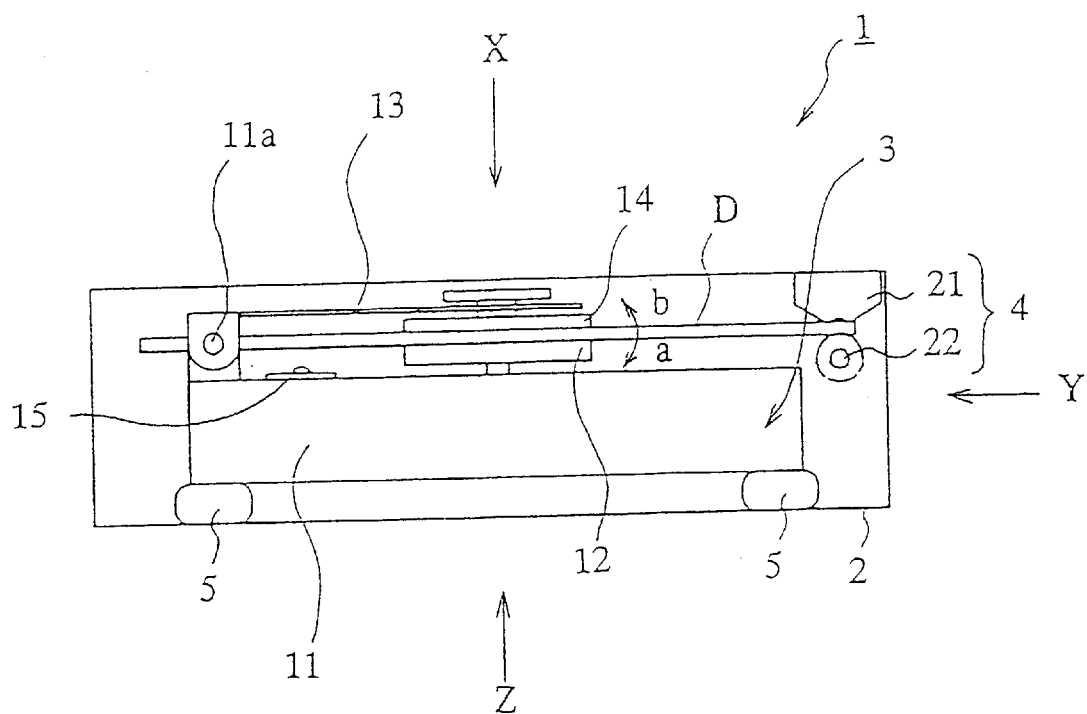
FIG. 1 is a schematic view showing a disk device for use in an automobile.
Figure 3:
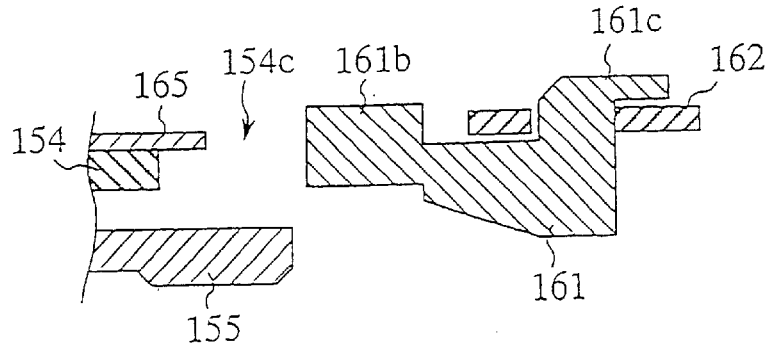
FIG. 3 shows a disk stopper in a conventional disk device.
Figure 9:
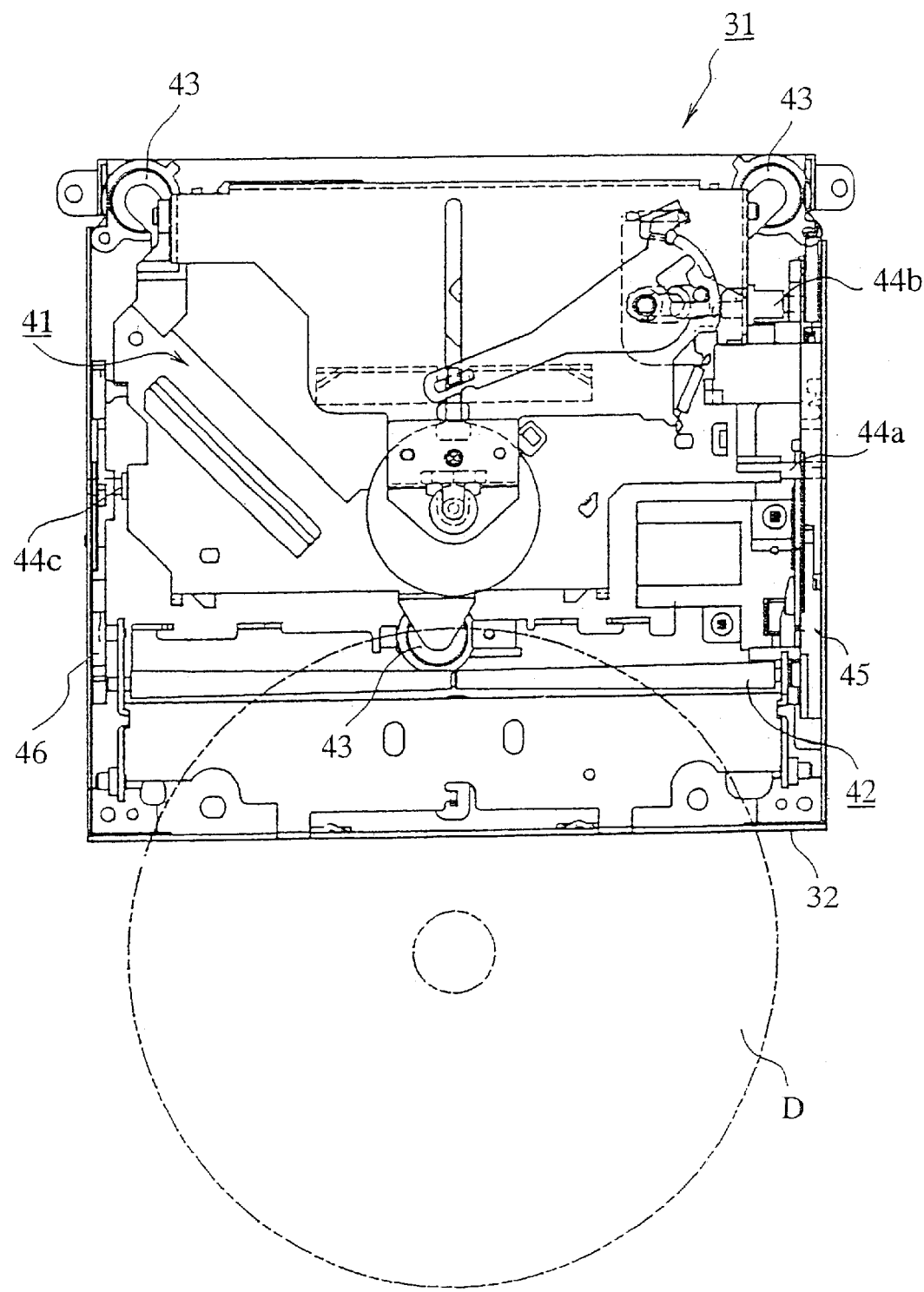
FIG. 9 shows the internal structure of the chassis of a disk device according to a first embodiment of the present invention.

FIG. 9 shows the interior of the chassis of a disk device according to a first embodiment of the present invention. FIG. 9 shows the interior of the chassis of a disk device seen from direction X of FIG. 1. FIG. 9 shows the initiation of insertion of a 12 cm disk. In FIG. 9, the 12 cm disk is shown by a broken line. In FIG. 9, 41 is a playing unit for reading the information recorded on the disk D. 42 is a conveying unit which conveys the disk which is inserted into the interior of the chassis 32 from the disk insertion aperture, to the playing unit 41. Then the conveying unit conveys the disk D which has been conveyed to the playing unit 41 to the disk insertion aperture and expels the disk to the outside of the chassis 32. 43 is a flexible member such as a oil damper which prevents the transmission of automobile vibrations to the playing unit while the disk is being played. The flexible member is disposed between the lower plate of the chassis 32 and the playing unit 41. 44a–44c are first to third positional determination shafts provided in the playing unit 41. 45 is a camplate which fixes the playing unit by fixing the first and second determination shafts and releases the playing unit 41 by releasing the first and second positional determination shafts 44a, 44b. The camplate is provided between the right plate of the chassis 32 and the playing unit 41. 46 is a lock plate which fixes the playing unit by fixing the third positional determination shaft 44c and which releases the playing unit 41 by releasing the fixation of the third positional determination shaft 44c. The lock plate is disposed between the left plate of the chassis 32 and the playing unit 41. The playing unit 41 is suspended from the chassis 32 by a plurality of springs not shown in the figure.

Figure 10:
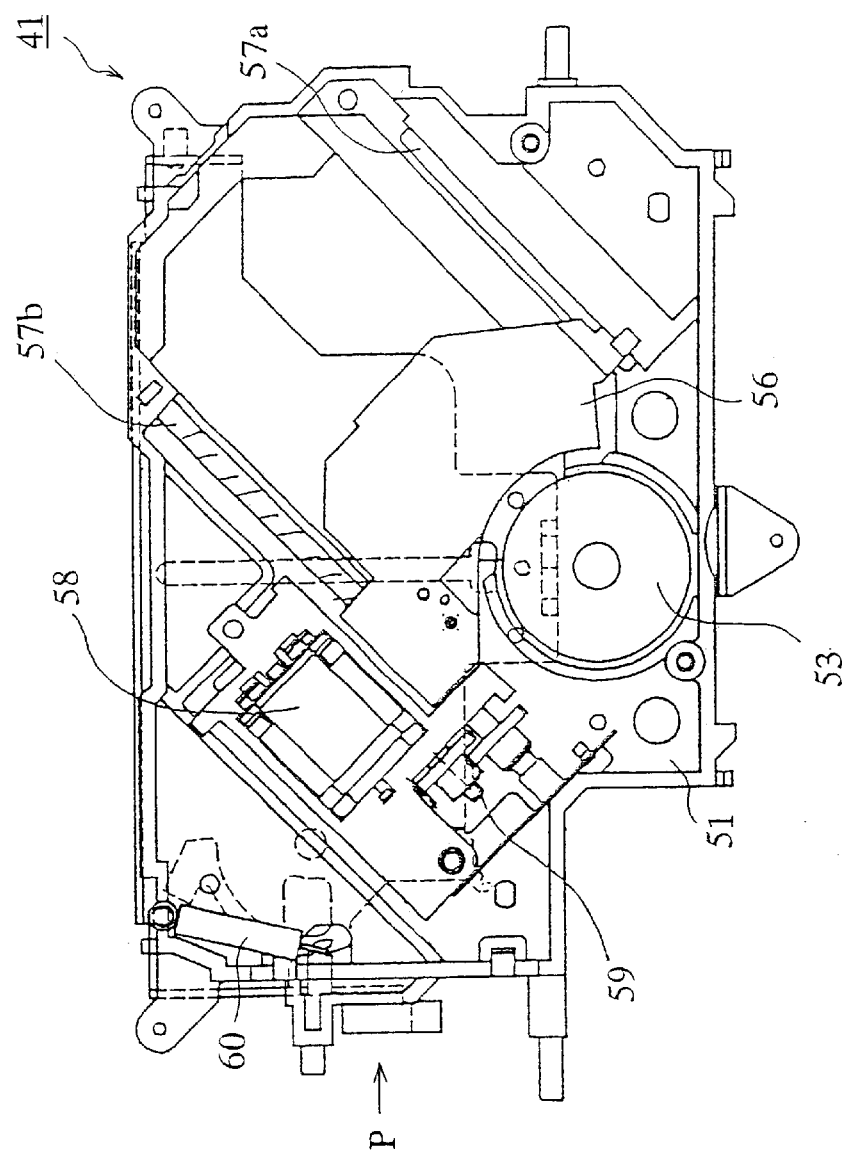
FIG. 10 shows a playing unit of a disk device according to a first embodiment of the present invention. (A) shows the structure as seen from direction Z in FIG. 1. (B) shows the structure as seen from direction P in (A).
Figure 10:
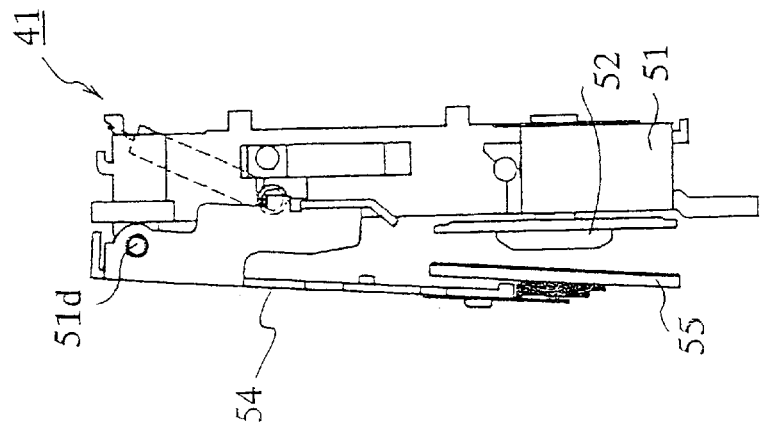

FIG. 10 shows a playing unit of a disk device according to a first embodiment of the present invention. FIG. 10(A) shows the playing unit as seen from direction Z in FIG. 1. FIG. 10(B) shows the playing unit as seen from direction P in FIG. 10(A). FIG. 10 shows the device before insertion of a disk or after expulsion of a disk. In FIG. 10, 51 is a playing unit base which stores a motor which displaces a pickup or a motor for rotating a turntable. 51d is a rotation shaft of a pressure arm and is disposed on the playing unit base 51. 52 is a turntable on which is disposed a disk and which rotates the mounted disk. The turntable is disposed on the playing unit base 51. 53 is a first motor for rotating the turntable 52. 54 is a pressure arm which rotates about the rotation shaft 51d disposed on the playing unit base 51. 55 is a disk gripping body which tightly holds the disk against the turntable by rotating the pressure arm towards the turntable 52. The disk gripping body 55 is mounted on the pressure arm 54. 56 is a pickup which reads the information recorded on the disk and which is mounted on the playing unit base 51. 57a is a guiding groove which supports the pickup 56. 57b is a guide shaft which supports the pickup 56. 58 is a second motor which displaces the pickup 56. 59 is reducing mechanism which transmits the rotations of the second motor 58 to the guide shaft 57b.

In this disk device, the rotations of the second motor 58 are transmitted to the guide shaft 57b through the reducing mechanism 59 and the guide shaft 57b rotates. Hence the pickup 56 is displaced along the pair of guides comprised of the guiding groove 57a and the guide shaft 57b.

Figure 11:
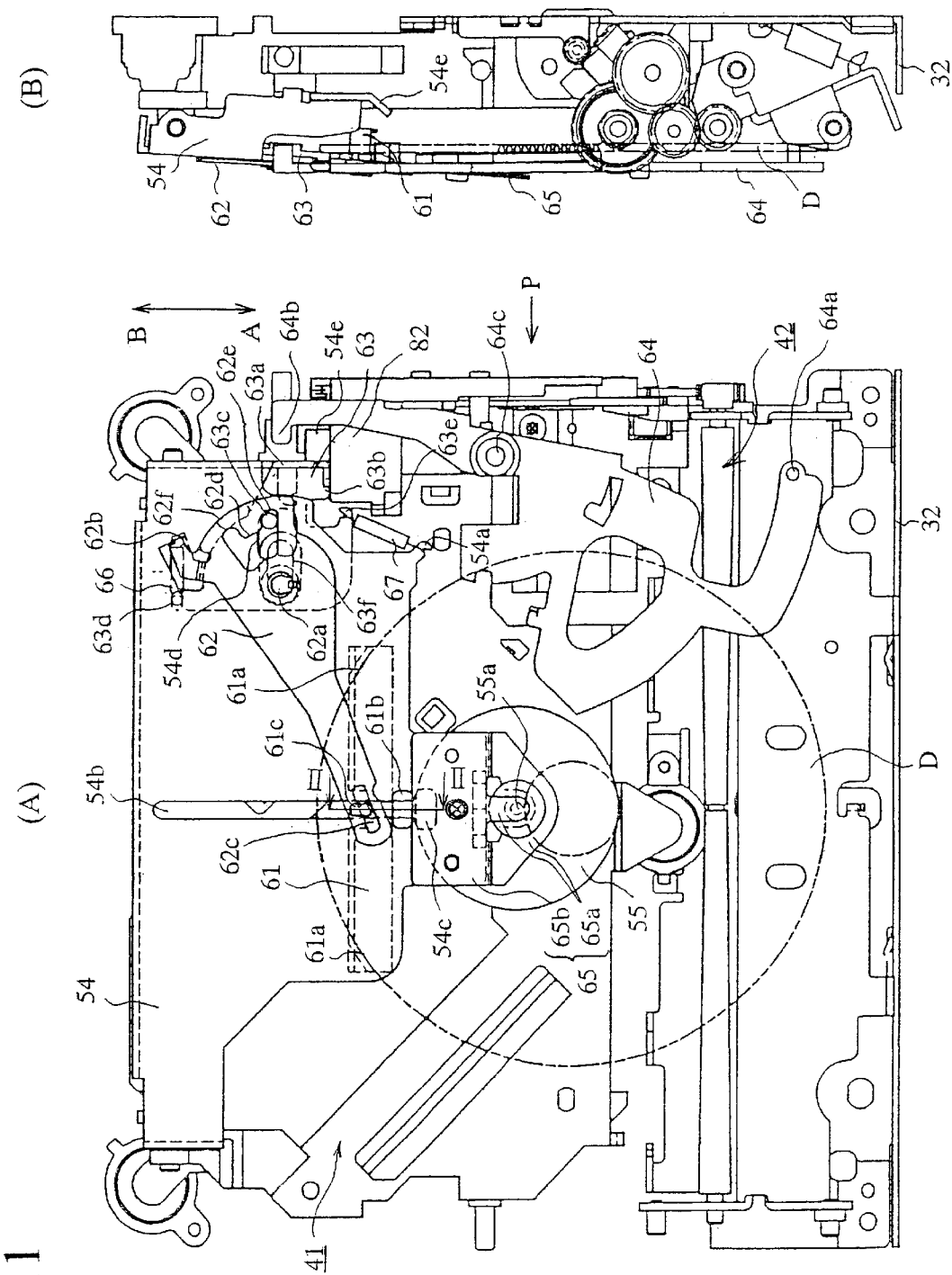
FIG. 11 shows a playing unit and a conveying unit conveying a 8 cm disk in a disk device according to a first embodiment of the present invention. (A) shows the structure as seen from direction X in FIG. 1. (B) shows the structure as seen from direction P in (A).
Figure 12:
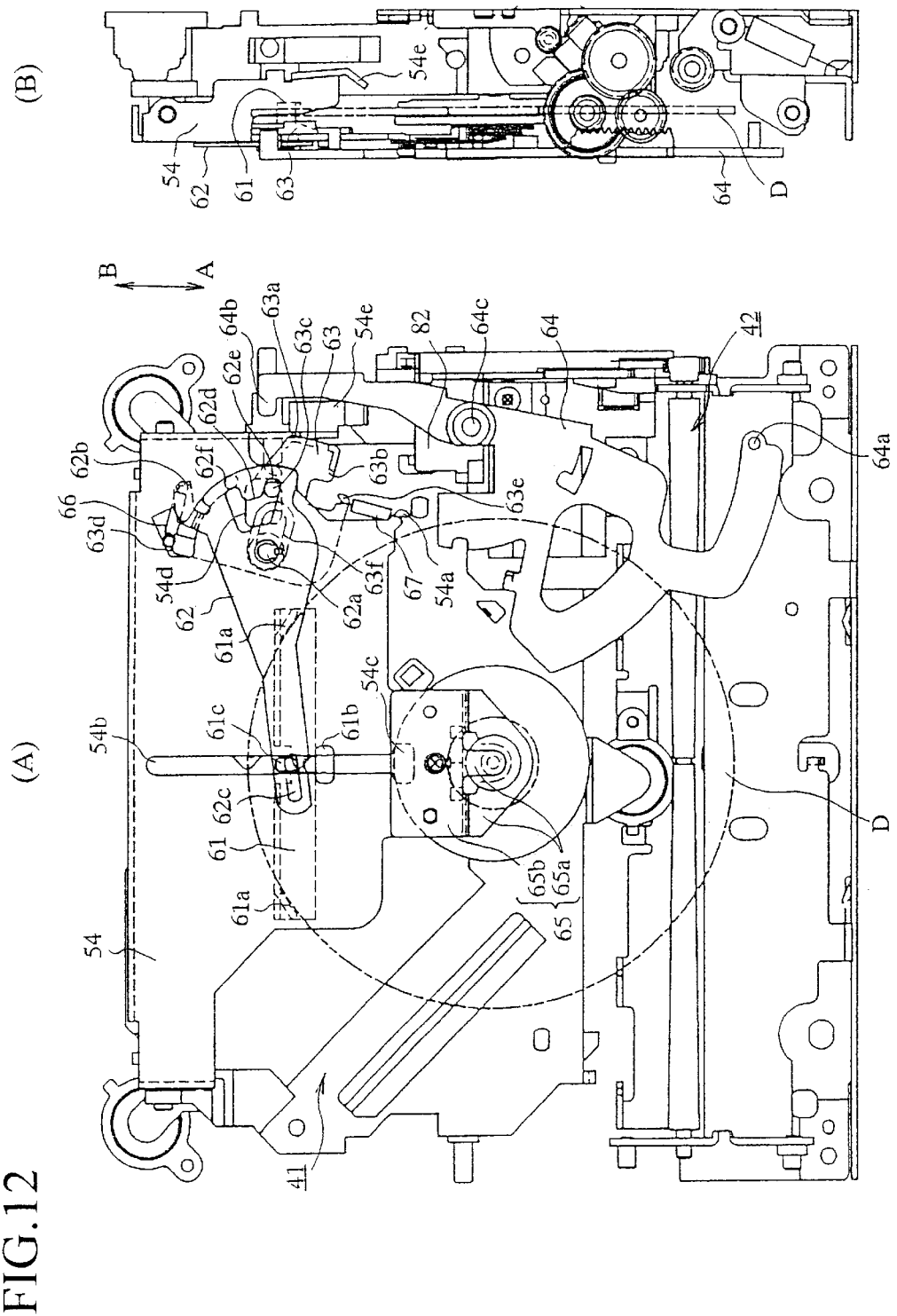
FIG. 12 shows a playing unit and a conveying unit playing an 8 cm disk in a disk device according to a first embodiment of the present invention. (A) shows the structure as seen from direction X in FIG. 1. (B) shows the structure as seen from direction P in FIG. 11(A).
Figure 13:
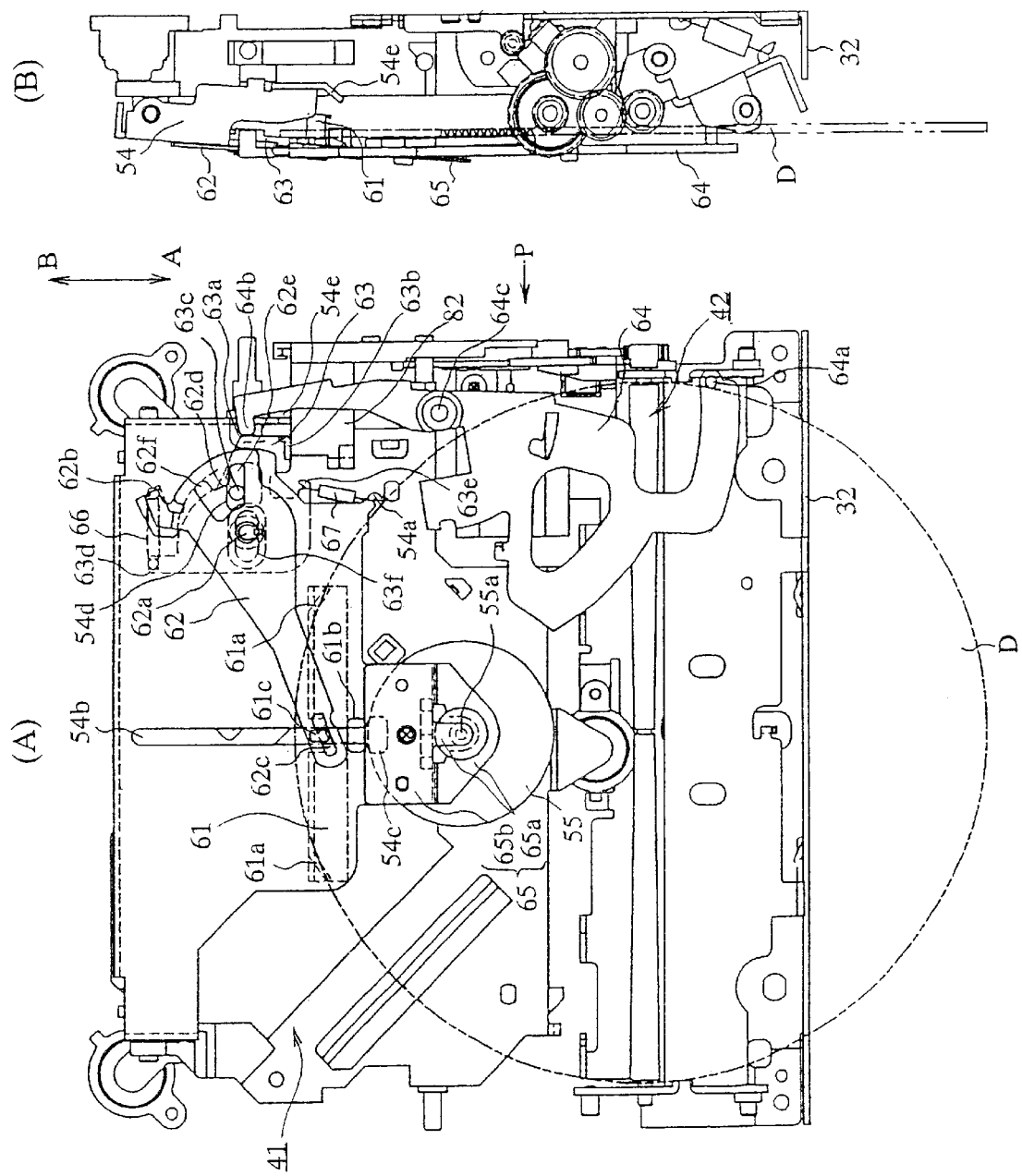
FIG. 13 shows a playing unit and a conveying unit conveying a 12 cm disk in a disk device according to a first embodiment of the present invention. (A) shows the structure as seen from direction X in FIG. 1. (B) shows the structure as seen from direction P in FIG. 11(A).
Figure 14:
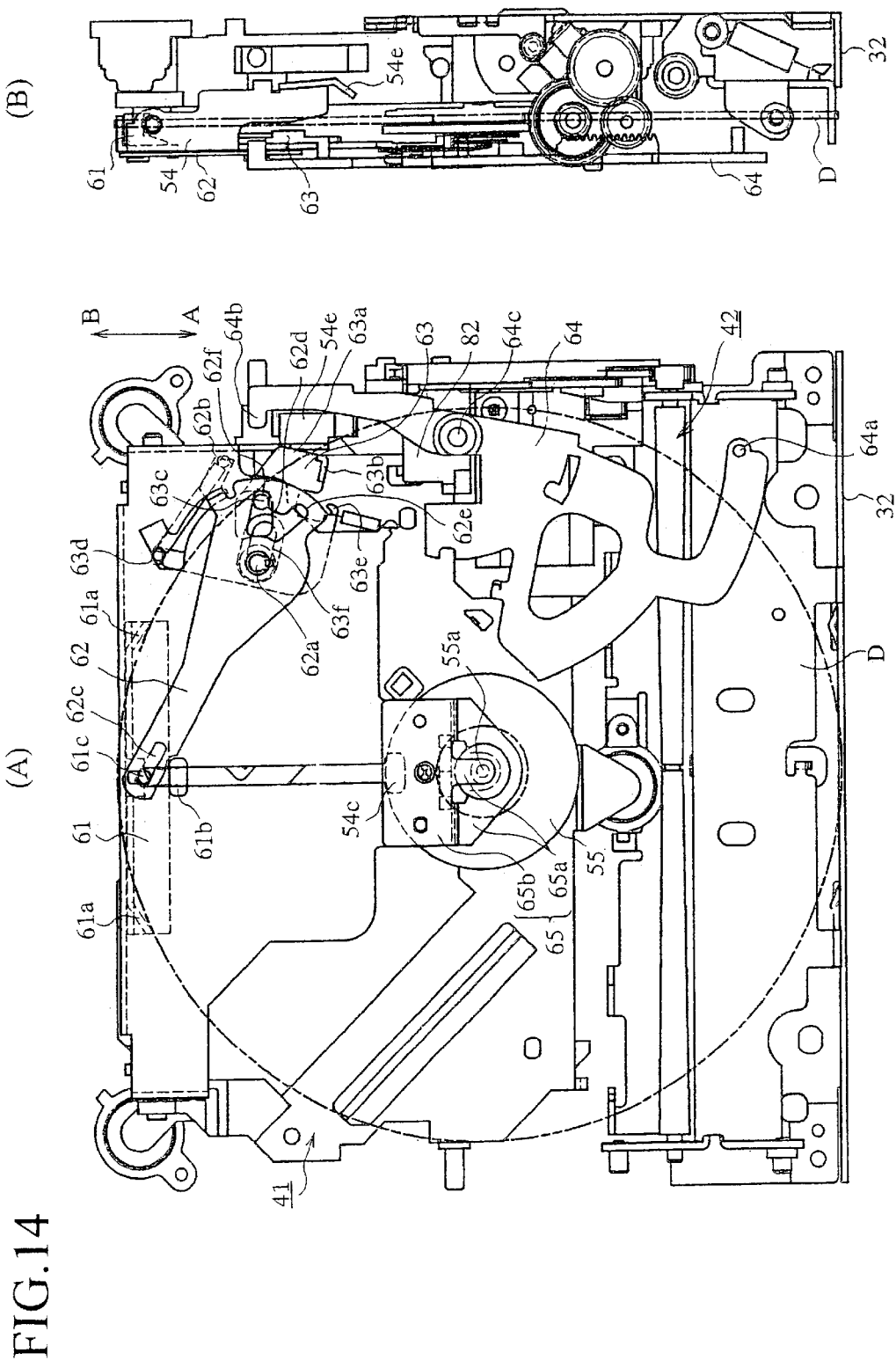
FIG. 14 shows a playing unit and a conveying unit playing a 12 cm disk in a disk device according to a first embodiment of the present invention. (A) shows the structure as seen from direction X in FIG. 1. (B) shows the structure as seen from direction P in FIG. 11(A).
Figure 15:
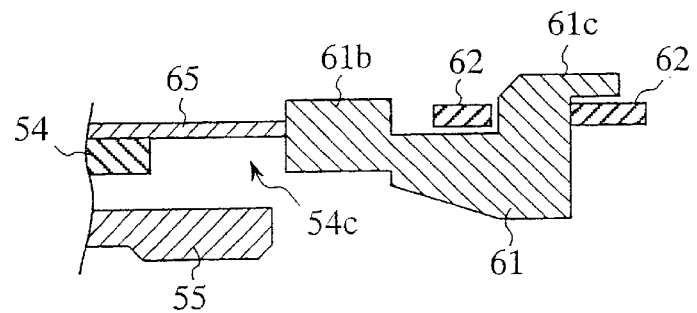
FIG. 15 shows a disk stopper in a disk device according to a first embodiment of the present invention.

FIGS. 11–14 show the playing unit and the conveying unit of the disk device according to the present invention. FIG. 11(A), FIG. 12(A), FIG. 13(A) and FIG. 14(A) show the playing unit and the conveying unit as seen from direction X of FIG. 1. FIG. 11(B), FIG. 12(B), FIG. 13(B) and FIG. 14(B) show the playing unit and the conveying unit as seen from direction P of FIG. 11(A). FIG. 11 shows the conveying of a 8 cm disk. FIG. 12 shows the playing of a 8 cm disk. FIG. 13 shows the conveying of a 12 cm disk. FIG. 14 shows the playing of a 12 cm disk. In FIGS. 11 and 12, the 8 cm disk is shown by a broken line. In FIGS. 13 and 14, the 12 cm disk is shown by a broken line. FIG. 15 shows a disk stopper of a disk device according to a first embodiment of the present invention. FIG. 15 is a cross section along line II—II in FIG. 11(A). In FIGS. 11–15, 61 is a disk stopper which pressures the disk D inserted into the interior of the chassis 32 and which displaces in direction B (direction of disk insertion). 62 is a lever stopper which rotates together with the displacement of the disk stopper 61. The lever stopper is disposed on the upper face of the pressure arm 54. 63 is a slide lock which rotates together with the rotations of the lever stopper 62 and, when a disk D is not inserted into the interior of the chassis 32, determines the position of the disk stopper 62. When the slide lock 63 rotates together with the rotations of the lever stopper 62, it slidingly displaces the operational lever 82, which will be explained hereafter, in direction A (the direction of disk expulsion). The slide lock 63 is disposed on the lower side of the pressure arm 54. 64 is a front arm which rotates on being pushed by the 12 cm disk D which is inserted into the interior of the chassis 32 and which displaces the slide lock 63 so that the regulation of the lever stopper 62 due to the slide lock 63 is released. 65 is a support member for mounting the disk gripping body 55 on the pressure arm 54. 66 is a first spring (flexible member) which is connected to the lever stopper 62 and the slide lock 63. 67 is a second spring which is connected to the pressure arm 54 and the slide lock 63.

In the disk stopper 61, 61a is an abutting section which abuts with a disk D which has been inserted into the interior of the chassis. 61b is an engaging section which engages with the guide hole which is formed on the pressure arm 54. 61c is an engaging pin which engages with the engaging hole formed on the lever stopper 62.

In the lever stopper 62, 62a is a rotation shaft of the lever stopper 62. 62b is a connecting section connecting with the first spring 66. 62c is an engaging hole which engages with the engaging pin 61c which is provided on the disk stopper 61. 62d is a regulating hole which supports the regulating pin provided on the slide lock 63. 62e is a first regulating section constituting the regulating hole 62d. 62f is a second regulating section constituting the regulating hole 62d.

In the slide lock 63, 63a is a pressed section which is pressured by the front arm 64. 63b is a pressing section which presses the operational lever 82 to be explained hereafter. 63c is a regulating pin which is supported by the regulating hole 62d formed on the lever stopper 62. 66d is a connecting section to the first spring 66 is connected. 63e is a connecting section to which the second spring 67 is connected. 63f is a slide hole supporting the rotation shaft 62a of the lever stopper 62.

In the front arm 64, 64a is an abutting pin with which the 12 cm disk D, which is inserted into the interior of the chassis 32, abuts. 64b is a pressing section which pushes the lever stopper 62. 64c is a rotation shaft of the front arm 64.

In the pressure arm 54, 54a is a connecting section to which the second spring 67 is connected. 54b is a guide hole which is pierced by the engaging pin 61c which is provided on the disk stopper 62, which engages with the engaging section 61b provided on the disk stopper 62 and which guides the disk stopper 61 which is pressed by the disk which is inserted into the interior of the chassis 32. The guide hole 54b is formed along the direction of conveying of the disk D in roughly the central section of the pressing arm 54. 54c is an engaging section insertion hole which is formed in order to engage the engaging section 61b provided on the disk stopper 61 and the guide hole 54b. 54d is a through hole formed in order to support the regulating pin 63c provided on the slide lock 63 with the regulating hole 62d formed on the lever stopper 62.

In the supporting member 65, 65a is a supporting section which supports the disk gripping body 55 by pushing the upper central projection of the disk gripping body 55. 65b is a covering section 55a which covers the engaging section insertion hole 54c which is formed on the pressure arm 54.

In this disk device, when a disk D is not inserted into the interior of the chassis 32, the position of the operational lever 82 is fixed. As a result, the position of the slide lock 63 is fixed. The position of the lever stopper 62 and the disk stopper 61 are fixed by the fact that regulating pin 63c provided on the slide lock 63 is positioned on the first regulating hole 62e which constitutes the regulating hole 62d formed on the lever stopper 62. In this disk device, when a disk is not inserted into the chassis 32, the engaging section 61b provided on the disk stopper 61 abuts with the supporting member 65. Hence the engaging section 61b provided on the disk stopper 61 pushes against the supporting member 65 as a result of the force of the first spring 66 connected to the lever stopper 62 and the slide stopper 61. Due to this arrangement, when a disk is not inserted into the interior of the chassis 32, the disk stopper 61 does not wobble and the generation of unwanted noises is avoided.

In this disk device, the engaging section insertion hole 54c formed on the pressure arm 54 is covered by the covering section 65b of the supporting member 65. Due to this arrangement, it is possible to prevent the engaging section 61b provided in the disk stopper 61 from detaching from the engaging section insertion hole 54c formed in the pressure arm 54 and the disk stopper 61 from falling out.

Furthermore in this disk device, when a disk D is inserted into the chassis 32, the disk D abuts with the abutting section 61a of the disk stopper 61 and the disk stopper 61 displaces in direction B on being pushed by the disk D. Together with the displacement of the disk stopper 61, the lever stopper 62 rotates. As a result of the rotation of the lever stopper 62, the slide lock 63 rotates. Hence the operational lever 82 slidingly displaces in direction A on being pushed by the pressure arm 63b of the slide lock 63.

When a 12 cm disk D is inserted into the chassis 32, the 12 cm disk D abuts with the abutting pin 64a provided in the front arm 64 and the front arm rotates being pushed by the 12 cm disk D. The slide lock 63 displaces on being pushed by the pressing section 64b of the front arm 64. The regulating pin 63c which is positioned on the first regulating section 62e detaches from the first regulating section 62e. Hence in a state when the regulating pin 63c is detached from the first regulating section 62c, when the disk stopper 61 displaces in direction B on being pushed by the 12 cm disk D, the lever stopper 62 rotates together with the displacement of the disk stopper 61. Further when the disk stopper 61 displaces in direction B, the front arm 64 is returned to the original position and the regulating pin 63c enters the second regulating section 62e. When the disk stopper 61 displaces in direction B, the lever stopper 62 rotates together with the displacement of the disk stopper 61. The slide lock 63 rotates together with the rotations of the lever stopper 62. Hence the operational lever 82 displaces in direction A on being pushed by the pressing section 63b of the slide lock 63.

Figure 16:
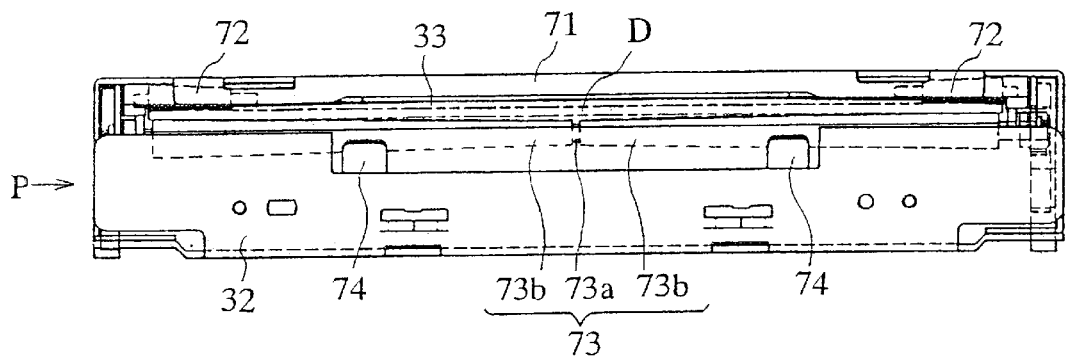
FIG. 16 shows a conveying unit in a disk device according to a first embodiment of the present invention. (A) shows the structure as seen from direction Y in FIG. 1. (B) shows the structure as seen from direction P in (A).
Figure 16:
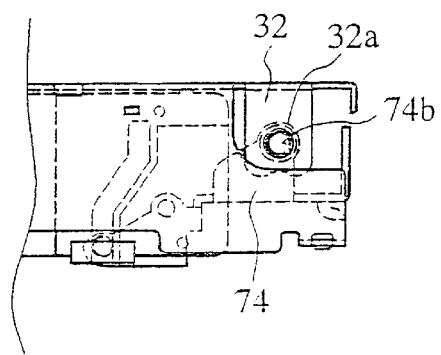
Figure 17:
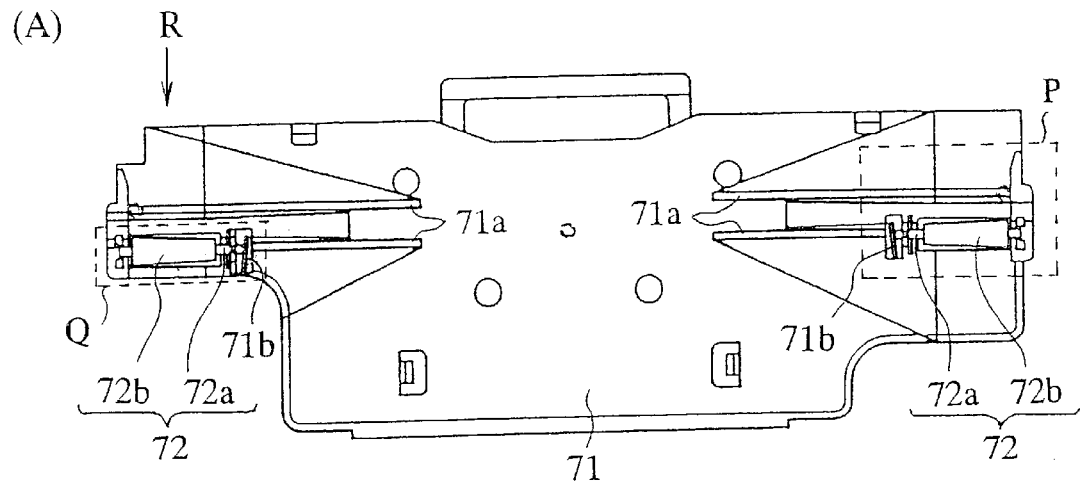
FIG. 17 shows a playing unit and a disk guide section and a supplementary roller according to a first embodiment of the present invention. (A) shows the structure as seen from direction Z in FIG. 1. (B) shows the enlarged structure of section P encircled by a broken line in (A). (C) shows the enlarged structure of section Q from direction R encircled by a broken line in (A).
Figure 17:
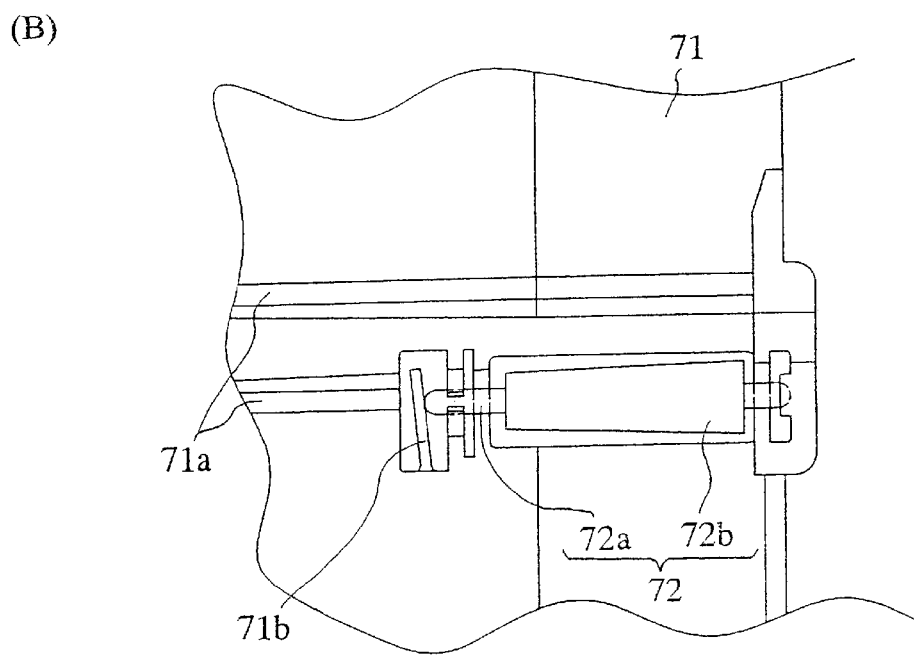
Figure 17:
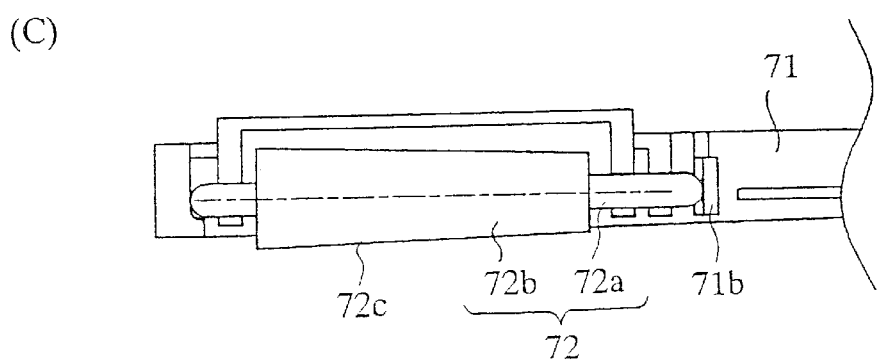

FIG. 16 shows a conveying unit in a disk device according to a first embodiment of the present invention. FIG. 16(A) shows the conveying unit as seen from direction Y of FIG. 1. FIG. 16(B) shows the conveying unit as seen from direction P of FIG. 16(A). FIG. 16(A) shows the conveying of a 12 cm disk. FIG. 16(B) shows the disk being played. In FIG. 16(A), the 12 cm disk is shown by a broken line. FIG. 17 shows a disk guiding section and a supplementary roller in a disk device according to a first embodiment of the present invention. FIG. 17(A) shows the disk guiding section as seen from direction Z of FIG. 1. FIG. 17(B) shows an enlarged section P encircled by the broken line in FIG. 17(A). FIG. 17(C) shows an enlarged section Q, as seen from direction R, encircled by the broken line in FIG. 17(A). In FIGS. 16 and 17, 71 is a disk guiding section fixed to the upper plate of the chassis 32. 72 is a supplementary roller disposed at the end of the disk guide section 71 so that outer cylindrical face is positioned on the conveying roller side by the protruding section formed on the disk guiding section 71. 73 is a conveying roller which holds the disk inserted into the interior of the chassis 32 from the disk insertion aperture 33 tightly against either the disk guiding section 71 or the supplementary roller 72 and conveys the disk D to the playing section by rotating it in that state. Then the conveying roller 73 holds the disk D conveyed to the playing section tightly against either the disk guide section 71 or the supplementary roller 72 and conveys it to the disk insertion aperture 33 by rotating it in that state and expels the disk D to the outside of the chassis 32. 74 is a conveying unit base.

In the disk guiding section 71, 71a is a protruding section which is formed from the central section towards the end so that it nears the conveying roller 73 and is vertical to the direction in which the disk is conveyed.

71b is a blade spring section which pushes the rotation shaft of the supplementary roller 72 in the axial direction.

In the supplementary roller 72, 72a is a rotation shaft of the supplementary roller 72 which is mounted on the disk guiding section 71 so that it is horizontally oriented and vertical with respect to the direction of conveying the disk. 72b is a cylindrical section (rotation section) of the supplementary roller 72. 72c is the outer face of the cylindrical section 72b.

In the conveying roller 73, 73a is a shaft of the conveying roller 73 and is inserted into the round hole formed in the conveying unit base 74, explained hereafter, so that it is vertically aligned to the direction of conveying the disks. 73b is a rubber roller into which the shaft of the conveying roller 73 is loosely inserted and which has an increasing radius from the central section towards the end.

In this disk device, when a disk is conveyed, the rubber roller 73b is pressured by the disk D. Thus the rubber roller 73b closely adheres to the shaft 73a and the shaft 73a and rubber roller 73b rotate integrally due to the friction between the shaft 73a and rubber roller 73b. Furthermore when a force greater than that friction is added to the disk D in the direction of conveying and in the direction opposite to conveying, only the shaft 73a rotates. By such an arrangement, it is possible to prevent damage by the conveying roller 73 to the recording face of the 12 cm disk D on the conveying roller side.

Furthermore in this disk device, a supplementary roller 72 is disposed on the end of the disk guiding section 71 so that the cylindrically shaped section 72b on the outer surface 72c of the supplementary roller 72 is disposed on the side of the conveying roller side 73 by the protruding section 71a formed on the disk guiding section 71. As a result, when a 8 cm disk is conveyed or during the initial or final conveying of a 12 cm disk, the disk is tightly held between the protruding section 71a formed on the disk guiding section 71 and the conveying roller 73. During the conveying of a 12 cm disk, the disk D is tightly held between the supplementary roller 72 mounted on the disk guiding section 71 and the conveying roller 73. By such an arrangement, when the 12 cm disk is conveyed, the disk can be conveyed smoothly and it is possible to prevent problems with the insertion or expulsion of disks D because the force added to the disk in the direction of conveying and in the direction opposite to the direction of conveying is reduced.

In this disk device, the rotation shaft 72a of the supplementary roller 72 is mounted on the disk guiding section 71 so as to be horizontal. As a result, the outer face 72c of the cylindrical section 72b of the supplementary roller 72 is adapted so as to extend to the end of the disk guiding section 71 and to be proximate to the conveying roller. Furthermore the protruding section 71a formed on the disk guiding section 71 has a shape which approaches to the conveying roller 73 to the end from the center. As a result, when a disk D is conveyed, the disk D is adapted so that only the outer edge comes into contact with the protruding section 71a or the supplementary roller 72 formed on the disk guiding section 71. Due to this arrangement, the recording surface of the disk D is prevented from being damaged by the supplementary roller 72 and the protruding section 71a formed on the disk guiding section 71.

In this disk device, the rotation shaft 72a of the supplementary roller 72 mounted on the disk guiding section 71 is pressured in the axial direction by the blade spring 71b formed on the disk guiding section 71. By this arrangement, the supplementary roller is stabilized and the generation of unwanted sounds is prevented.

Figure 18:
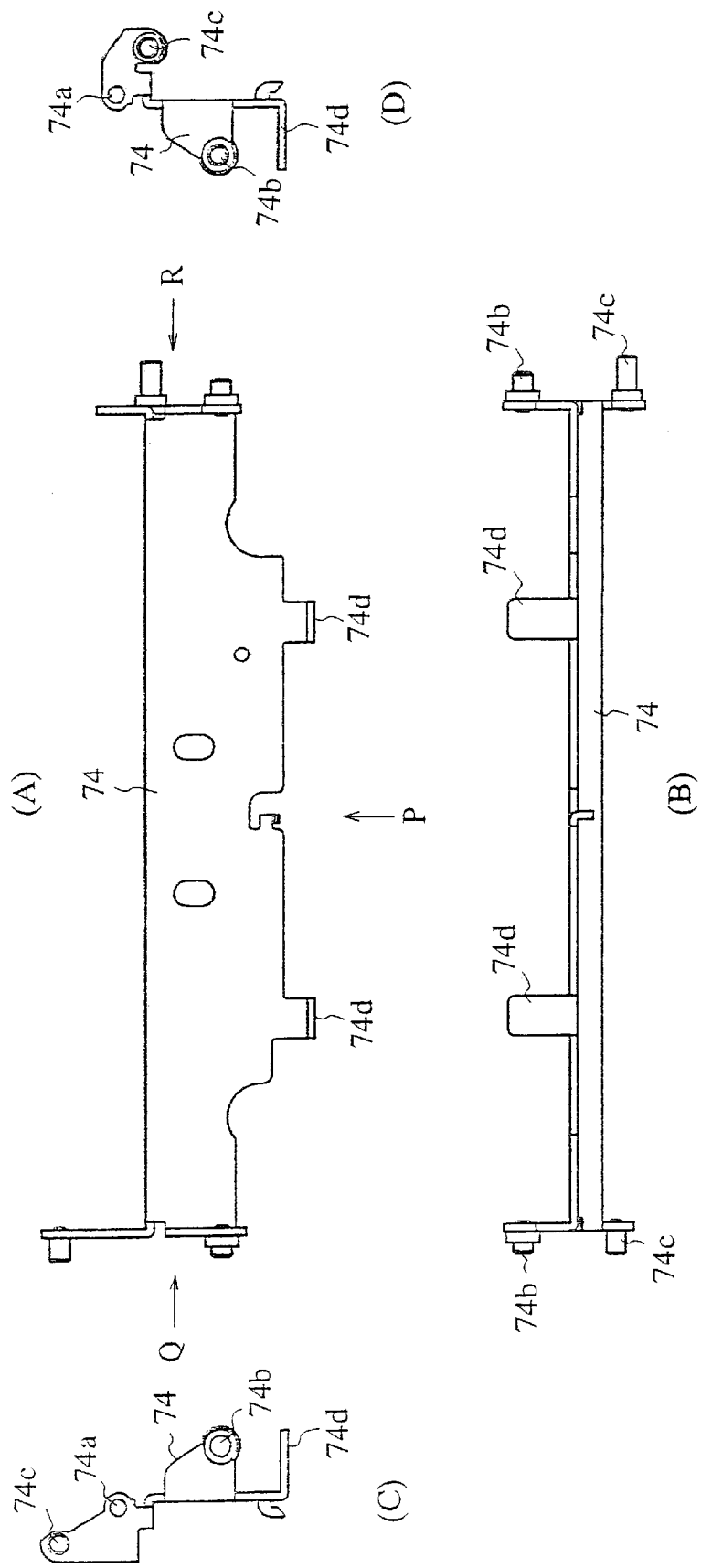
FIG. 18 shows a playing unit base according to a first embodiment of the present invention. (A) shows the playing unit base structure as seen from direction X in FIG. 1. (B) shows the structure as seen from direction P in (A). (C) shows the structure as seen from direction Q in (A). (D) shows the structure as seen from direction R in (A).

FIG. 18 shows a conveying unit base in a disk device according to the first embodiment of the present invention. FIG. 18(A) shows the conveying unit base as seen from direction X of FIG. 1. FIG. 18(B) shows the conveying unit base as seen from direction P of FIG. 18(A). FIG. 18(C) shows the conveying unit base as seen from direction Q of FIG. 18(A). FIG. 18(D) shows the conveying unit base as seen from direction R of FIG. 18(A). In FIG. 18, 74a is a round hole into which the shaft 73a of the conveying roller 73 is inserted. 74b is a rotation shaft of the conveying unit base 74 which is inserted into the round hole 32a (refer to FIG. 16(B)) formed in the chassis 32. 74c is a displacement shaft supported by the Z shaped holes formed respectively on the lock plate and the cam plate to be explained below. 74d is a double insertion prevention hook which prevents the insertion of another disk into the chassis by closing the disk insertion aperture when a disk is inserted into the chassis.

Figure 19:
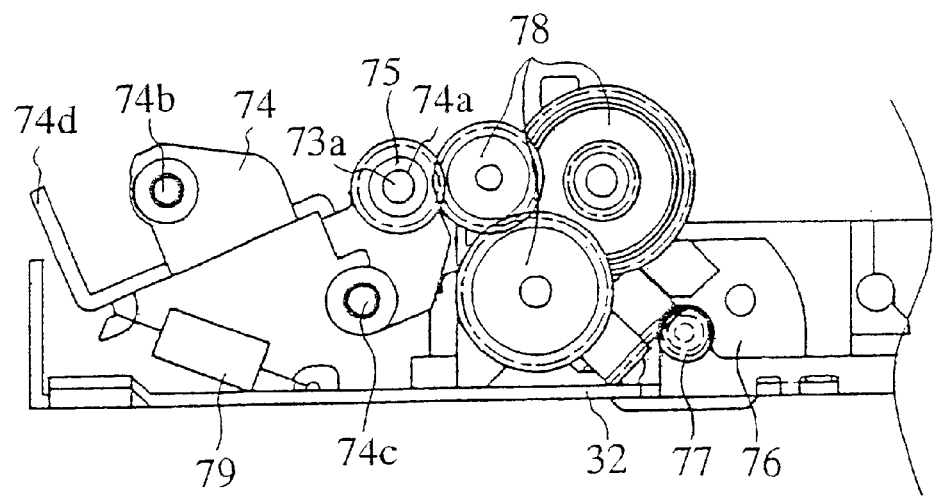
FIG. 19 shows a conveying unit and a set of reduction gears in a disk device according to a first embodiment of the present invention. (A) shows the structure when a disk is being conveyed. (B) shows the structure when a disk is being played.
Figure 19:
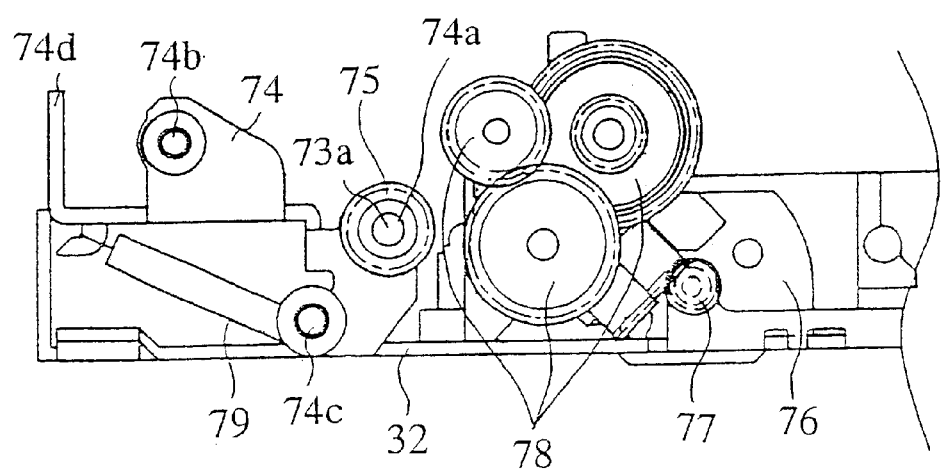

FIG. 19 shows the reduction gears and the conveying unit in the disk device according to the fist embodiment of the present invention. FIG. 19 shows the reduction gears and the conveying unit as seen from below FIG. 1. FIG. 19(A) shows a disk being conveyed. FIG. 19(B) shows a disk being played. 75 is a first gear press fitted into the shaft 73a of the conveying roller. 76 is a third motor for rotating the conveying roller and is provided on the chassis 32. 77 is a second gear press fitted into the rotation shaft of the third motor 76. 78 are reduction gears which transmit the rotations of the third motor 76 to the conveying roller and which are provided on the chassis 32. 79 is a third spring connecting the lower plate of the chassis 32 and the conveying unit base 74.

In this disk device, when a disk is conveyed, the disk is tightly held by the conveying roller and the disk guiding section or the supplementary roller due to the force of the third spring 79. At that time, the first gear 75, which is pressured by the chassis of the conveying roller, meshes with the reduction gears 78. The rotations of the third motor 76 are transmitted to the conveying roller through the second gear 77, the reduction gears 78 and the first gear 75 and hence the conveying roller rotates.

In this disk device, when a disk is played, the disk is not tightly held by the conveying roller and the disk guiding section or the supplementary roller. At that time, the first gear 75 is detached from the reduction gears 78. The rotations of the third motor 76 are not transmitted to the conveying roller.

Figure 2:
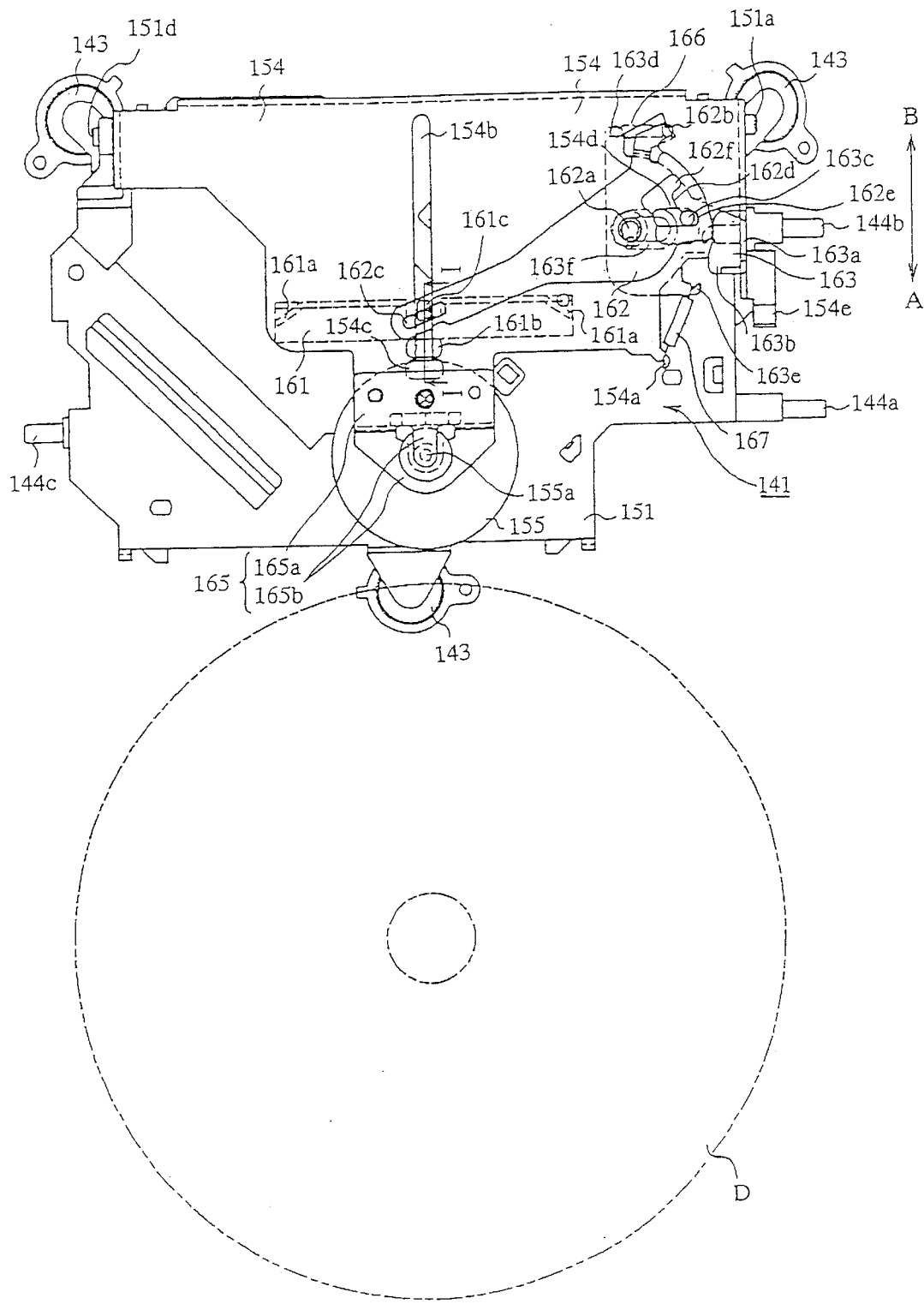
FIG. 2 shows a playing unit in a conventional disk device.
Figure 4:
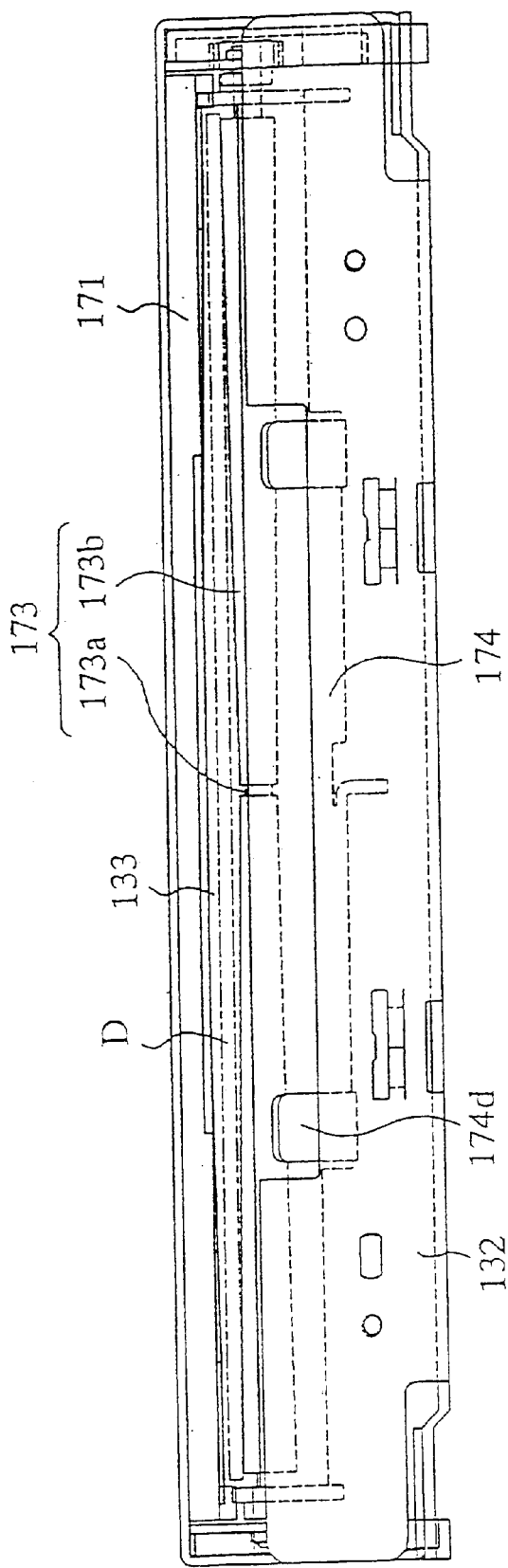
FIG. 4 shows a conveying unit in a conventional disk device.
Figure 5:
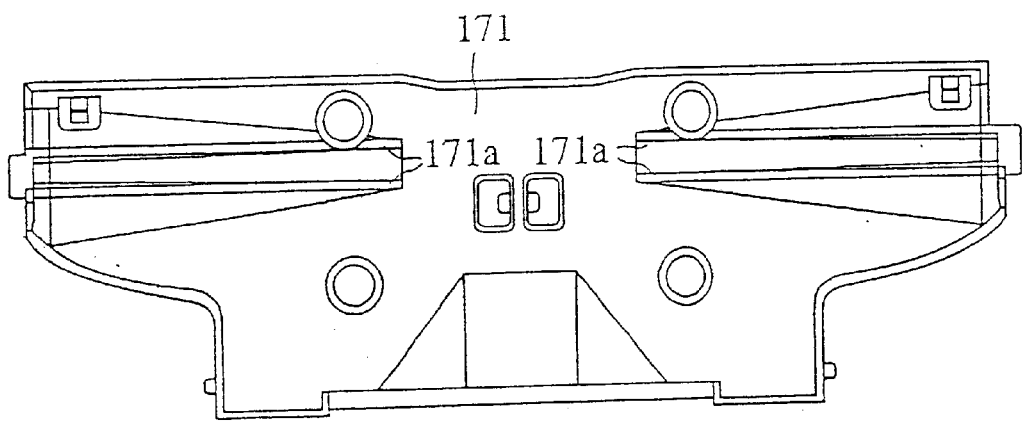
FIG. 5 shows a disk guiding device in a conventional disk device.
Figure 6:
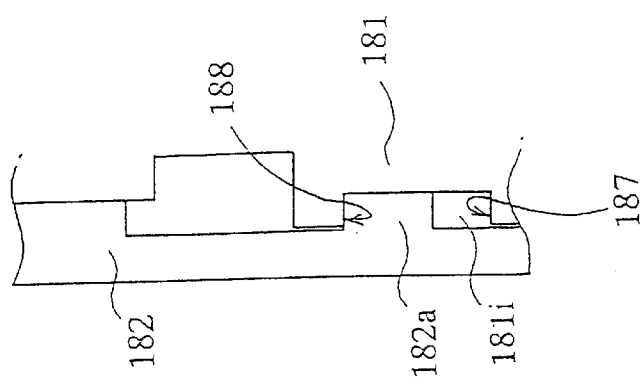
FIG. 6 shows the camplate and related parts in a conventional disk device. (A) shows the structure as seen along direction X in FIG. 1, (B) shows the structure as seen along direction P in (A), (C) shows an enlargement of section Q encircled by a broken line in (B).
Figure 6:
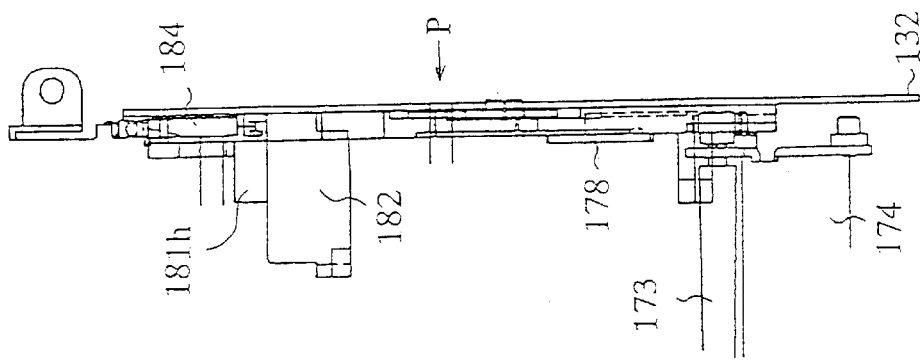
Figure 7:
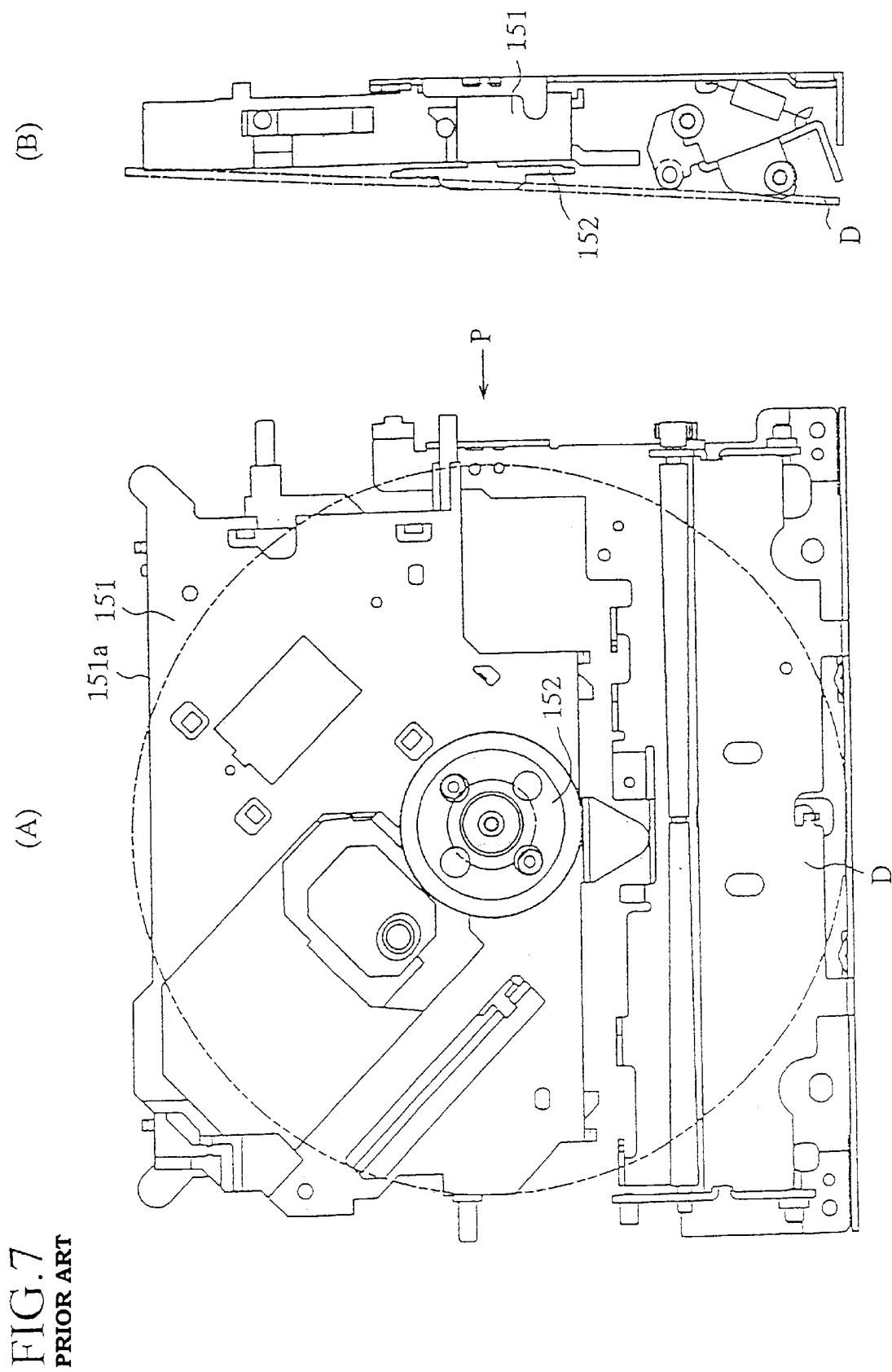
FIG. 7 shows a playing unit base in a conventional disk device. (A) shows the structure as seen from direction X in FIG. 1, (B) shows the structure as seen from direction P in (A).
Figure 20:
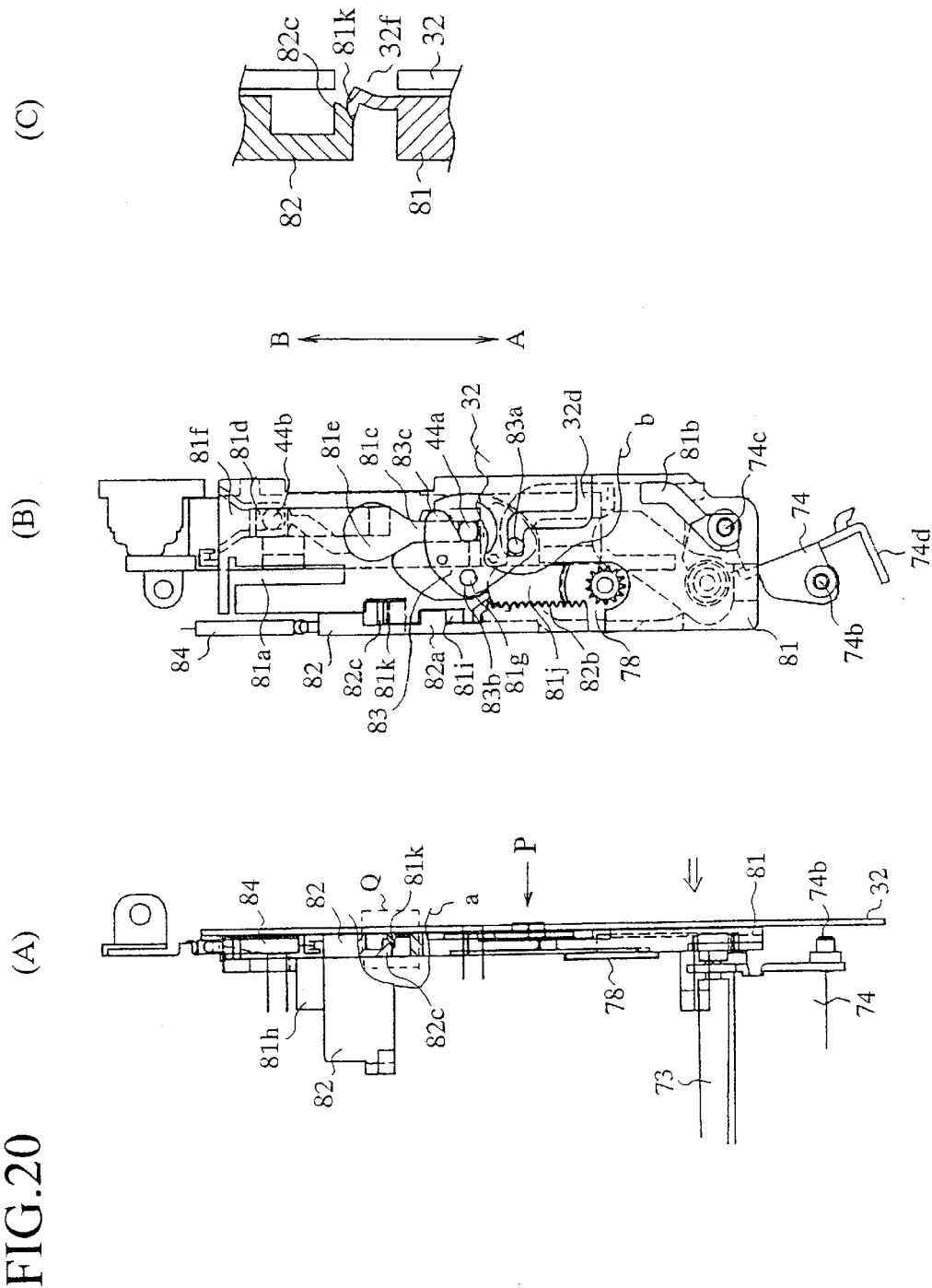
FIG. 20 shows a camplate and related parts in the first step of conveying a disk in a disk device according to a first embodiment of the present invention. (A) shows the structure as seen from direction X in FIG. 1. (B) shows the structure as seen from direction P in (A). (C) shows the enlarged structure of section Q encircled by a broken line in (A).
Figure 21:
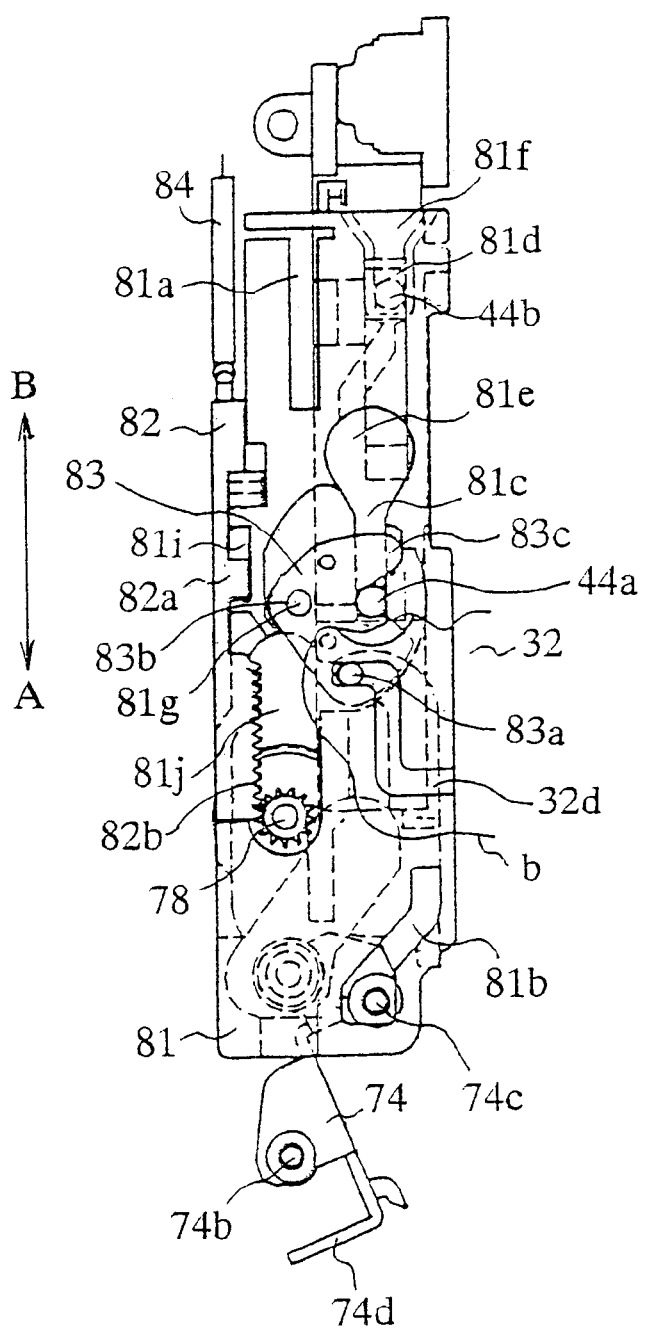
FIG. 21 shows a camplate and related parts in the second step of conveying a disk in a disk device according to a first embodiment of the present invention.
Figure 22:
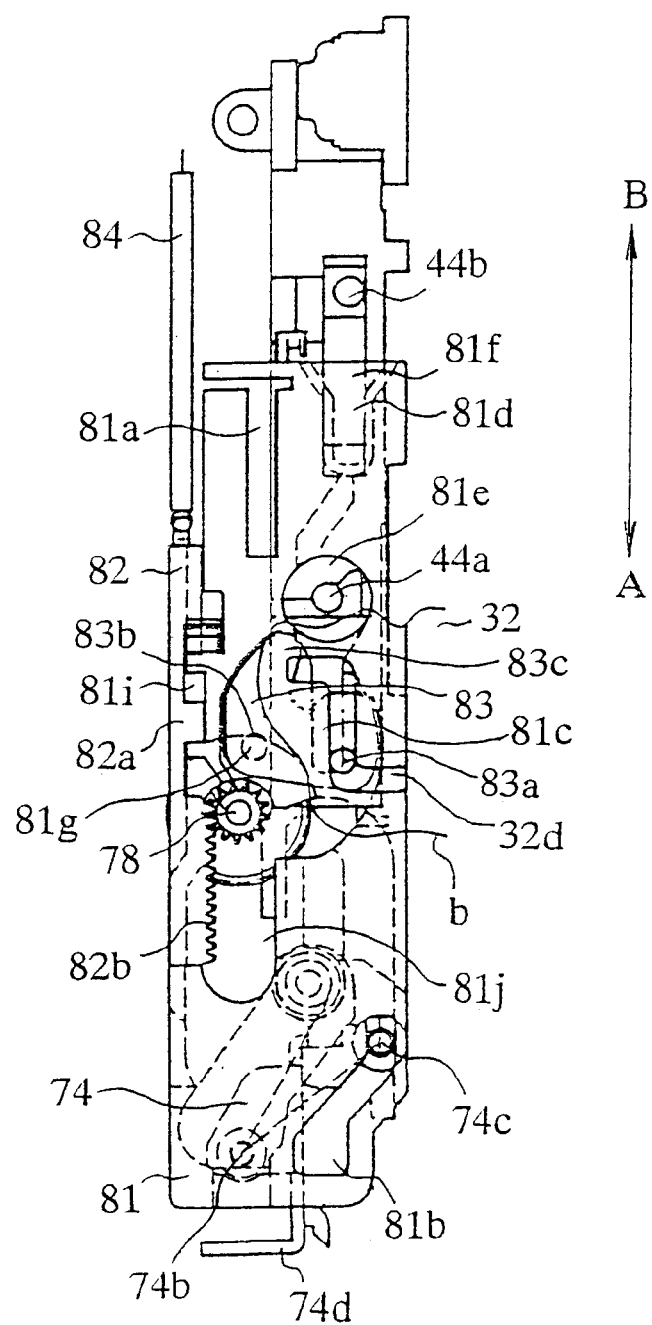
FIG. 22 shows a camplate and related parts when playing a disk in a disk device according to a first embodiment of the present invention.
Figure 23:
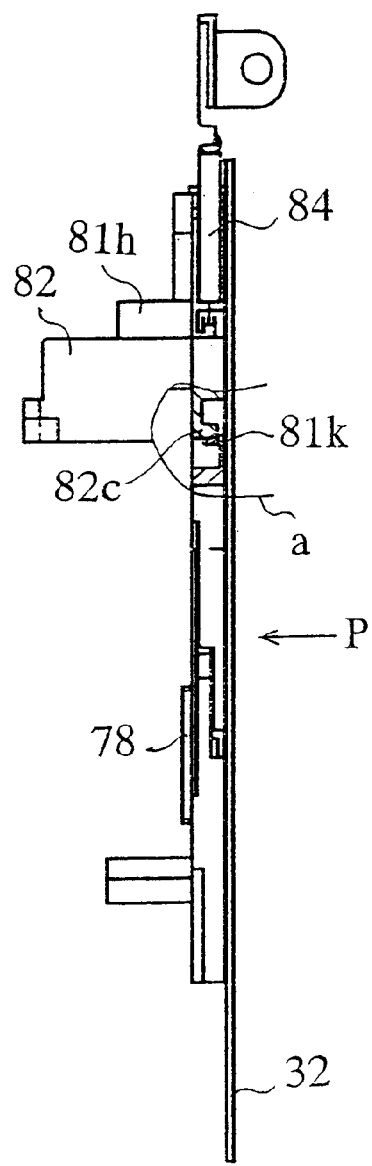
FIG. 23 shows a camplate and related parts in the first step of conveying a disk in a disk device according to a first embodiment of the present invention. (A) shows the structure as seen from direction X in FIG. 1. (B) shows the structure as seen from direction P in FIG. 20(A).
Figure 23:
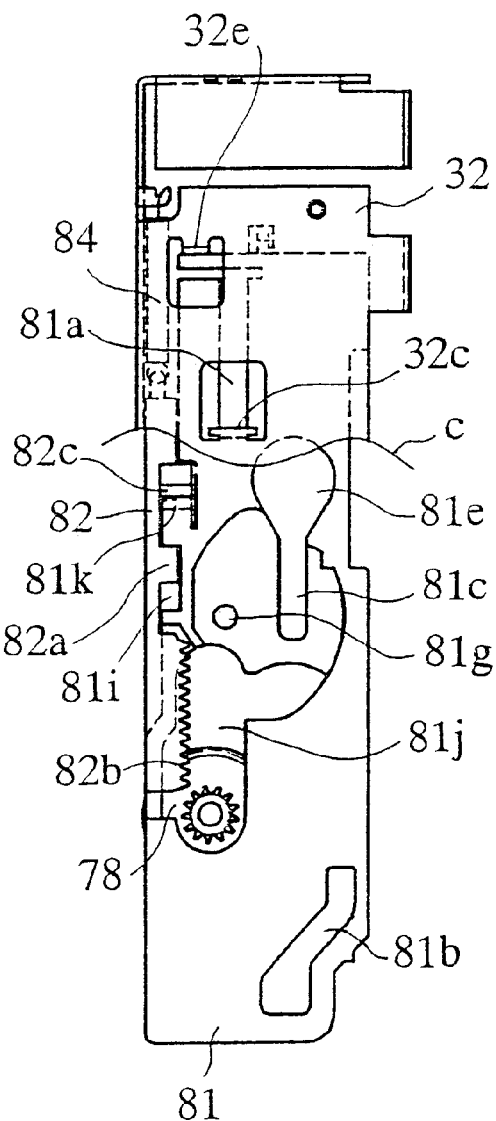
Figure 24:
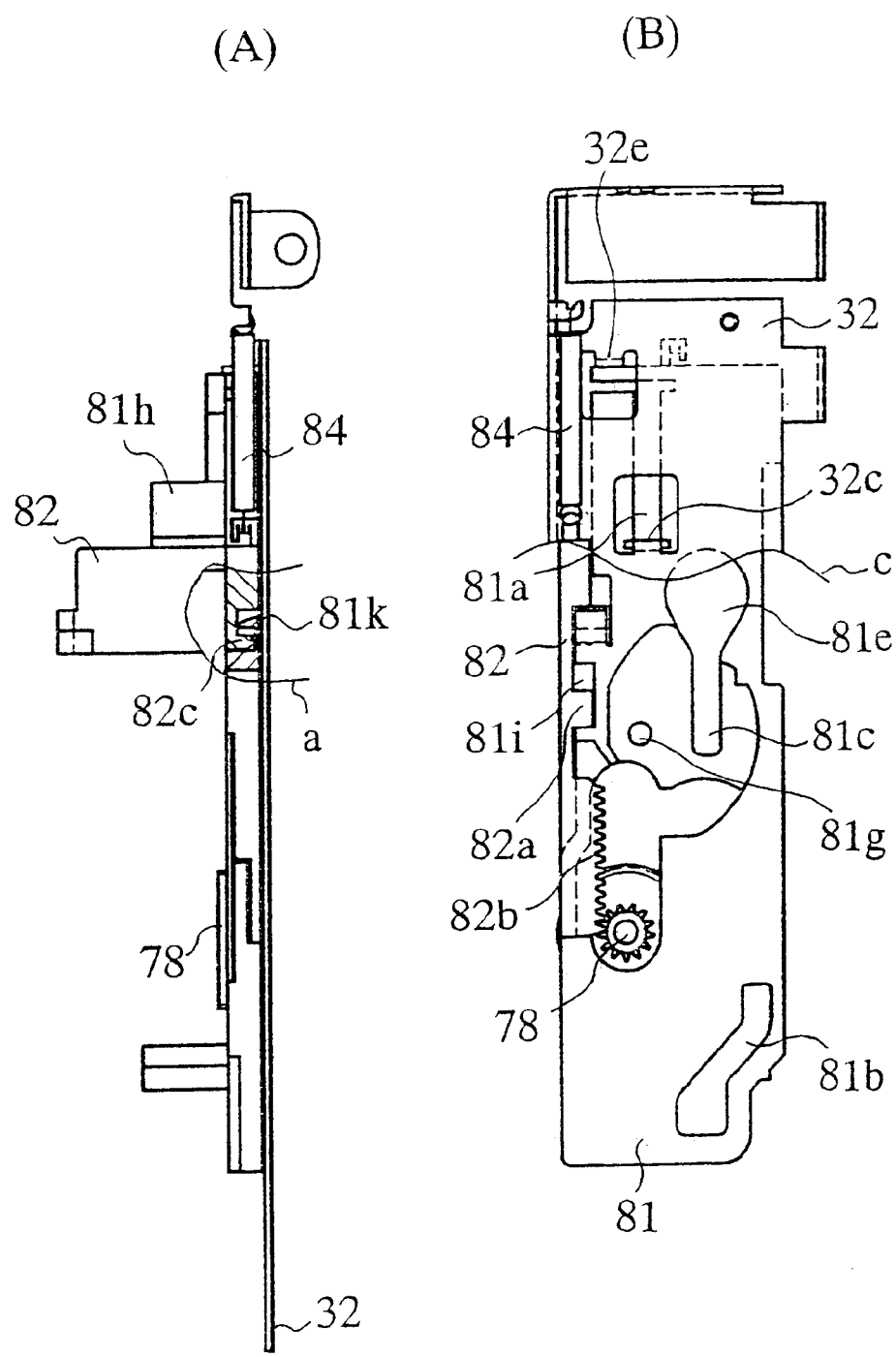
FIG. 24 shows a camplate and related parts in the second step of conveying a disk in a disk device according to a first embodiment of the present invention. (A) shows the structure as seen from direction X in FIG. 1. (B) shows the structure as seen from direction P in FIG. 20(A).
Figure 25:
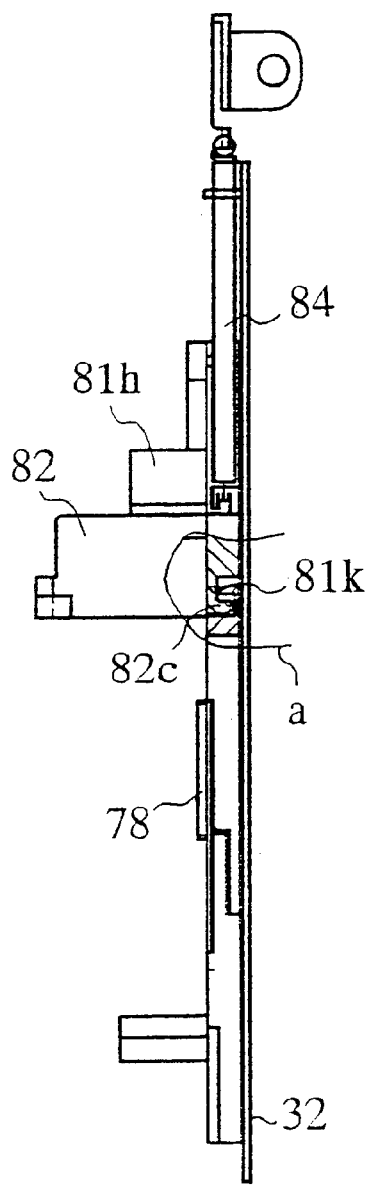
FIG. 25 shows a camplate and related parts when playing a disk in a disk device according to a first embodiment of the present invention. (A) shows the structure as seen from direction X in FIG. 1. (B) shows the structure as seen from direction P m FIG. 20(A).
Figure 25:
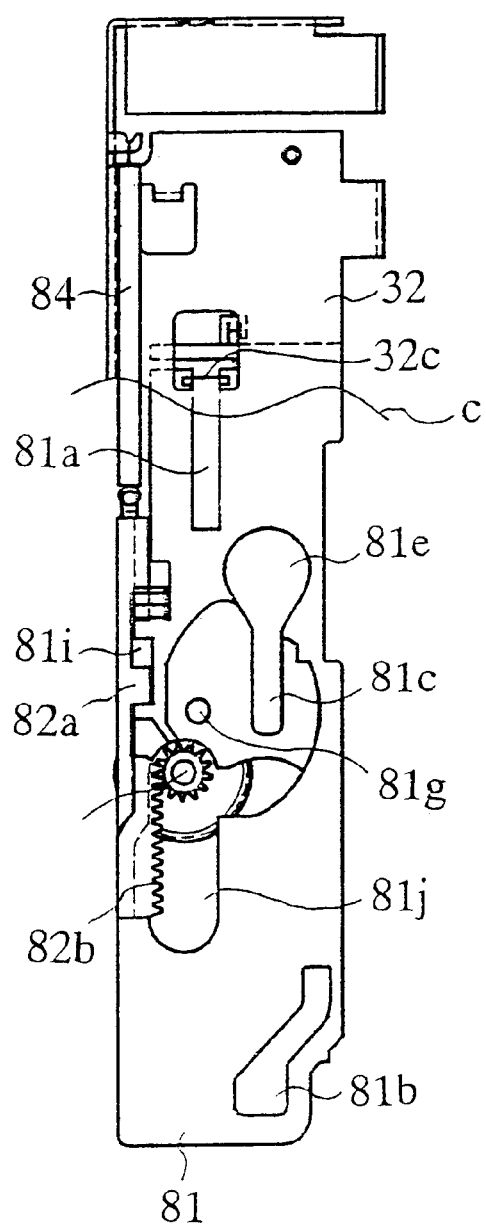
Figure 26:
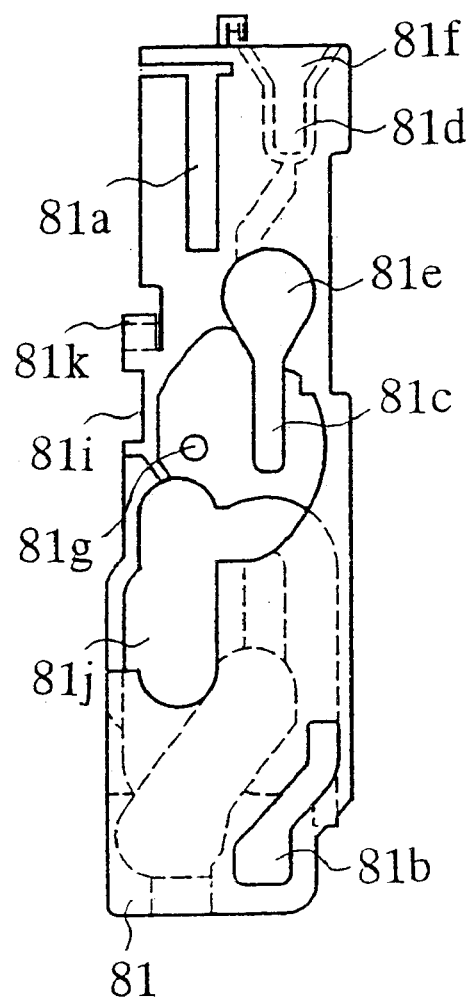
FIG. 26 shows a camplate in a disk device according to a first embodiment of the present invention

FIGS. 20–25 show the cam plate and related parts in a disk device according to a first embodiment of the present invention. FIG. 20(A), FIG. 23(A), FIG. 24(A) and FIG. 25(A) show the cam plate and related parts as seen from direction X of FIG. 1. FIG. 20(B), FIG. 21, FIG. 22, FIG. 23(B), FIG. 24(B) and FIG. 25(B) show the cam plate and related parts as seen from direction P of FIG. 20(A). FIG. 20(C) shows an enlargement of section Q encircled by a broken line in FIG. 20(A). FIGS. 20 and 23 show a first step when a disk is conveyed. FIGS. 21 and 24 show a second step when a disk is conveyed. FIGS. 22 and 25 show a disk being played. FIG. 20(A), FIG. 23(A), FIG. 24(A) and FIG. 25(A) show the section encircled by the bent line a as a cross section of the hook shaped projection of the cam plate and the hook shaped projection of the operational lever. FIG. 2(B), FIG. 21(B), FIG. 22(B) show the right side plate of the chassis encircled by a bent line b. FIG. 23(B), FIG. 24(B), FIG. 25(B) show the right side plate of the chassis as encircled on the right side of the bent line c. FIG. 26 shows the cam plate of the disk device according to a first embodiment of the present invention. FIG. 26 shows the cam plate as seen from the direction P of FIG. 20(A). In FIGS. 20–26, 81 is a cam plate which is provided between the right side plate of the chassis 32 and the playing unit. The cam plate slidingly displaces in the direction A–B. When it displaces in direction B, it displaces the pressure arm in the direction in which the turntable and the disk gripping body do not tightly hold the disk. Furthermore it displaces the conveying roller 73 in the direction in which the disk is tightly held by the disk guiding section and the conveying roller 73. When it displaces in direction A, it displaces the pressure arm in the direction in which the disk is tightly held by the turntable and the disk gripping body and displaces the conveying roller 73 in the direction in which the disk is not held tightly by the disk guiding section and the conveying roller 73. 82 is an operational lever which is provided on the cam plate 81. The operational lever 82 slidingly displaces in the direction A–B along the guide groove 32b (refer to FIG. 8)

formed on the chassis 32 and slidingly displaces the cam plate 81 in the direction A–B by that motion. 83 is a first linking member for fixing the playing unit when the cam plate slidingly displaces in the direction B and is provided between the chassis 32 and the operational lever 82. 84 is a fourth spring connecting the chassis 32 and the operational lever 82.

In the cam plate 81, 81a is a slot with which the key shaped hook formed on the right side plate of the chassis engages and which guides the cam plate 81. 81b is a Z shaped hole which supports the displacement shaft 74c provided on the conveying unit base 74 and which guides the displacement shaft 74c together with the sliding displacement of the cam plate 81. 81c is a horizontal hole which supports the first positional determination shaft 44a provided on the playing unit and which guides the first positional shaft 44a together with the sliding displacement of the cam plate 81. 81d is a horizontal groove which supports the second positional shaft 44b provided on the playing unit and which guides the second positional shaft 44b together with the sliding displacement of the cam plate 81. 81e is a release hole which releases the support of the first positional determination shaft 44a due to the horizontal hole 81c. 81f is a release groove which releases the support of the second positional determination shaft 44b due to the horizontal groove 81d. 81g is a rotation shaft of the first linking member 83 inserted into the round hole formed on the first linking member 83. 81h is an inclining section which abuts with the right side bent section 54e provided on the right side of the pressure arm 54 (refer to FIGS. 11–14) and which is formed to decline from direction A to B. 81i is an indented section which is formed on the upper section of the cam plate 81. 81j is a through hole which is pierced by the reduction gears 78. 81k is a first hooked projection (first engaging section) connecting the hooked projection formed on the operational lever 82.

In the operational lever 82, 82a is a protruding section which is provided in the indented section 81i formed on the cam plate 81. The protruding section 82a slidingly displaces the cam plate 81 in direction A together with the sliding displacement of the operational lever 82 by pushing the indented section 81i. 82b is a rack which engages with the reduction gears (gear) 78 and which slidingly displace the operational lever 82. 82c is a second hooked projection (second engaging section) which is connected with the hooked projection 81k formed on the cam plate 81 and which slidingly displaces the cam plate 81 in direction B together with the sliding displacement of the operational lever 82.

In the first linking member 83, 83a is a displacement shaft supported by the Z shaped hole formed on the right side plate of the chassis 32. 83b is a round hole into which is inserted rotation shaft 81g of the first linking member 83 formed on the cam plate 81. 83c is a gripping section which grips the first positional determination shaft 44a provided on the playing unit when the cam plate 81 slidingly displaces in direction B.

In the right side plate of the chassis 32, 32c is a key shaped hook which engages with the slot 81a formed on the cam plate 81. 32d is a Z shaped hole which supports the displacement shaft 83a provided on the first linking member 83 and which guides the displacement shaft 83a together with the sliding displacement of the cam plate 81. 32e is a control hook which controls the sliding displacement of the cam plate 81 in direction B. 32f is an aperture (refer to FIG. 8) formed in a position to connect and detach the hooked projection 81k formed on the cam plate 81 and the hooked projection 82c formed on the operational lever 82.

In this disk device, when the cam plate 81 slidingly displaces along the direction A–B, the displacement shaft 83a provided on the first linking member 82 displaces along the Z shaped hole 32c formed in the right side plate of the chassis 32. The first linking member 82 rotates about the rotation shaft 81g of the first linking member 82 formed on the cam plate 81. When the cam plate 81 slidingly displaces in the direction B, the first positional determination shaft is held by the gripping section 83c of the first linking member 83. The first positional determination shaft 44a is fixed in the horizontal hole 81c and the second positional determination shaft 44b is fixed in the horizontal groove 81d. On the other hand, when the cam plate 81 slidingly displaces in the direction A, the support of the first positional determination shaft 44a due to the horizontal hole 81c and the support of the second positional determination shaft 44b due to the horizontal groove 81d is released.

In this disk device, when the cam plate 81 slidingly displaces in the direction A–B, the displacement shaft 74c provided on the conveying unit base 74 displaces along the Z shaped hole 81b formed on the cam plate 81 and the conveying unit base 74 rotates about the rotation shaft 74b. When the cam plate 81 slidingly rotates in direction B, the conveying roller 74 displaces in the direction in which the disk is tightly held by the conveying roller 74 and the disk guiding section. When the cam plate 81 slidingly displaces in direction A, the conveying roller 74 displaces in the direction in which the disk is not tightly held by the conveying roller 74 and the disk guiding section.

In this disk device, when the cam plate 81 slidingly displaces in direction B, the pressure arm 54 rises and takes the disk from the turntable due to fact that the right side bent section 54e, provided on the pressure arm 54 along the inclined section 81h provided on the cam plate 81, rises. When the cam plate 81 slidingly displaces in direction A, the pressure arm 54 declines and places a disk on the turntable due to the right side bent section 54e being depressed along the inclination of the inclined section 81h due to the force of the fifth spring 60 (refer to FIG. 10(A)).

In this disk device, when a disk is inserted, the operational lever 82 slidingly displaces in direction A and the rack 82b formed on the operational lever 82 meshes with the reduction gears 78. Due to the motive force of the reduction gears 78, the operational lever 82 further slidingly displaces in direction A and the protruding section 82a formed on the operational lever 82 abuts with the indented section 81i formed on the cam plate 81 and then pressures the indented section 81i. As a result, the cam plate 81 slidingly displaces in direction A together with the displacement of the operational lever 82.

In this disk device, when the protruding section 82a formed on the operational lever 82 abuts with the indented section 81i formed on the cam plate 81, the first hooked shaped projection 81k formed on the cam plate 81 and the second hooked shaped projection 82c formed on the operational lever 82 are connected.

In this disk device, when a disk is expelled, the reduction gears 78 rotate in the inverse direction and the operational lever 82 slidingly displaces in the direction B. The second hooked shaped projection 82c formed on the operational lever 82 pressures the first hooked shaped projection 81k formed on the cam plate 81. As a result, the cam plate 81 slidingly displaces in direction B together with the sliding displacement of the operational lever 82. In addition the operational lever 82 further slidingly displaces in direction B due to the motive force of the reduction gears 78. Thus the cam plate 81 which slidingly displaces together with the sliding displacement of the operational lever 82 comes in contact with the control hook 32e formed on the right side plate of the chassis 32 and returns to its original position. Then only the operational lever 82 further displaces in direction B due to the motive force of the reduction gears 78 and the first hooked projection 81k and the second hooked projection 82c separate. After the first hooked projection 81k and the second hooked projection 82c separate, the operational lever 82 is drawn in direction B by the force of the fourth spring 84, returns to its original position and pressures the slide lock. As a result of this arrangement, when the cam plate 81 and the operational lever 82 are returned to their original position, any impediment to the disk being expelled from the chassis 32 is prevented.

In this disk device, the connecting and detaching positions of the first hooked projection 81k formed on the cam plate 81 and the second hooked projection 82c formed on the operational lever 82 are the same. The first hooked projection 81k and the second hooked projection 82c come into contact and detach due to the bending of the first hooked projection 81k.

In this disk device, an aperture 32f is formed on the right side plate of the chassis 32 in the connecting and detaching position of the first hooked projection 81k formed on the cam plate 81 and the second hooked projection 82c formed on the operational lever 82. By this arrangement, it is easy to place the first hooked projection 81k and the second hooked projection 82c in connection and in detachment by bending the first hooked projection 81k.

Figure 27:
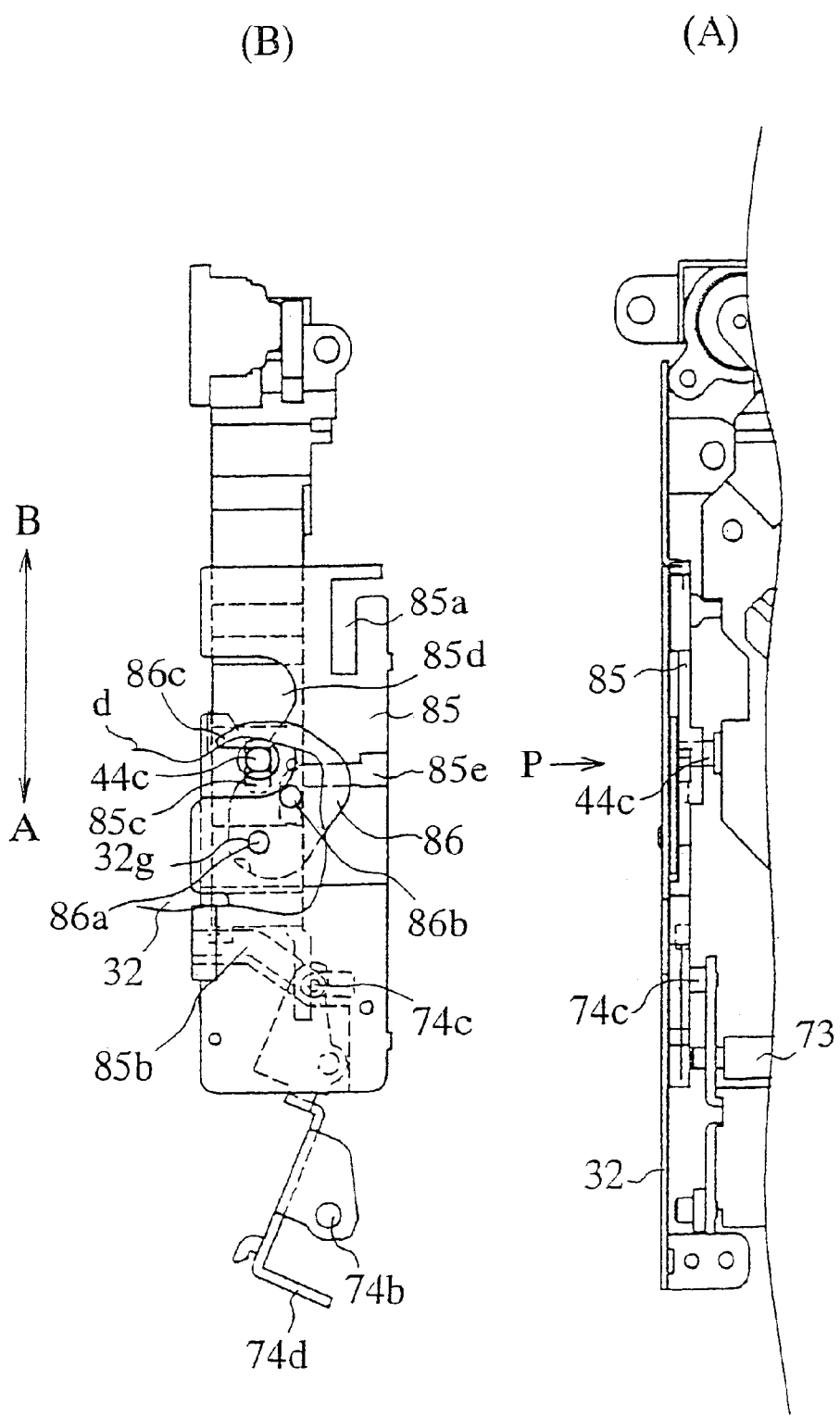
FIG. 27 shows a lock plate and related parts when conveying a disk in a disk device according to a first embodiment of the present invention. (A) shows the structure as seen from direction X in FIG. 1. (B) shows the structure as seen from direction P in (A).
Figure 28:
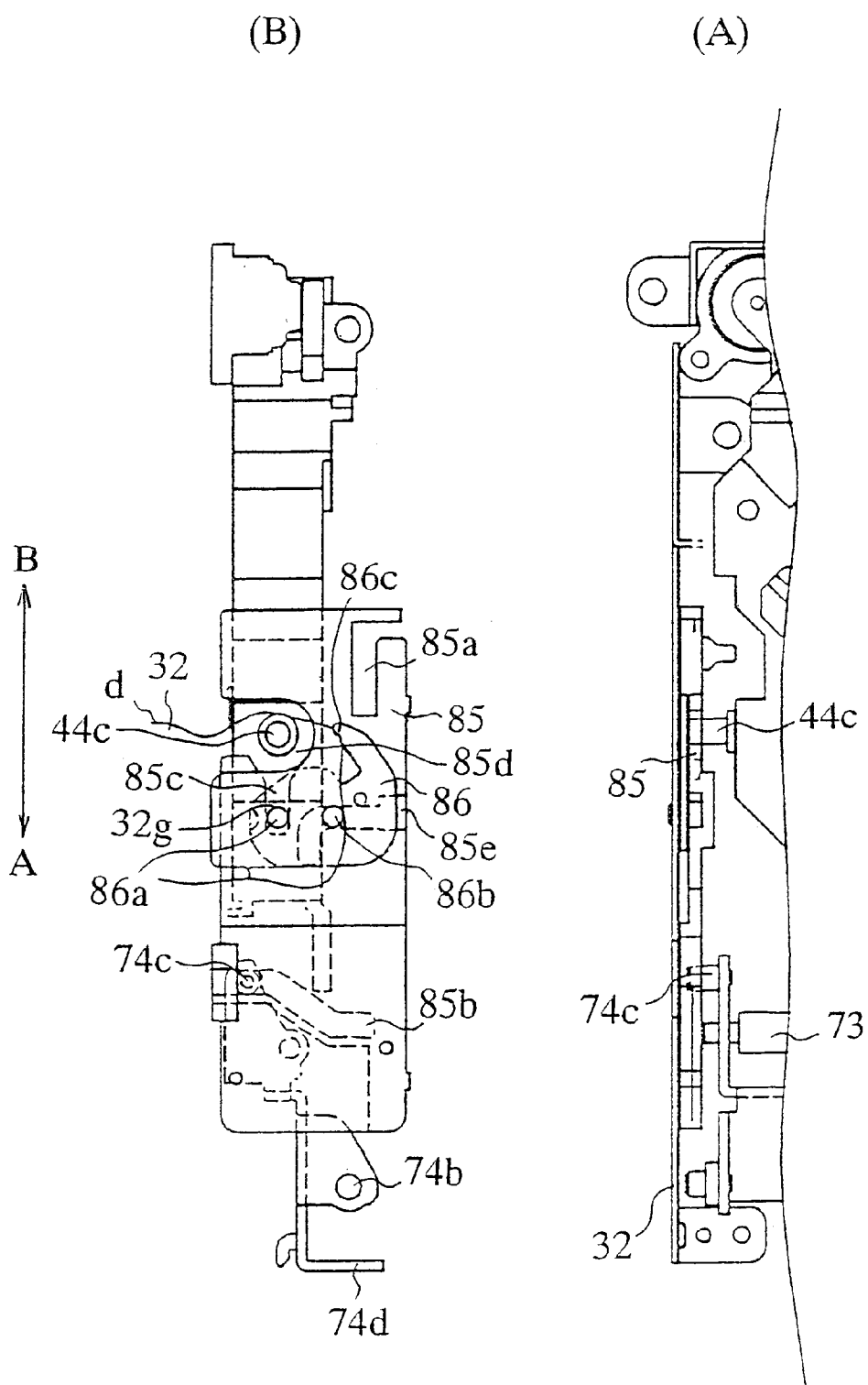
FIG. 28 shows a lock plate and related parts when playing a disk in a disk device according to a first embodiment of the present invention.

FIGS. 27 and 28 show the lock plate and related parts in a disk device according to a first embodiment of the present invention. FIG. 27(A) shows the lock plate and related parts as seen from direction X in FIG. 1. FIG. 27(B) and FIG. 28 snow the lock plate and related parts as seen from direction P in FIG. 27(A). FIG. 27 shows the disk being conveyed and FIG. 28 shows the disk being played. FIG. 27(B) and FIG. 28 snow a section encircled with a bent line from the left side plate of the chassis 32. In FIG. 27 and FIG. 28, 85 is a lock plate which slidingly displaces in direction A–B due to the sliding displacement of the cam plate 81 in the direction A–B and is provided between the left side plate of the chassis 32 and the play unit. 86 is a second linking member for fixing the play unit when the lock plate 85 slidingly displaces in direction B and is provided between the chassis 32 and the lock plate 85.

In the lock plate 85, 85a is a slot with which the key shaped hook, which is formed on the right side plate of the chassis 32, engages and which guides the lock plate 85. 85b is a Z shaped hole which supports the displacement shaft 74c provided on the conveying unit base 74 and which guides the displacement shaft 74c together with the sliding displacement of the lock plate 85. 85c is a horizontal hole which supports the third positional determination shaft 44c provided on the playing unit and which guides the third positional determination shaft 44c together with the sliding displacement of the lock plate 85. 85d is a release hole which releases the support of the third positional determination shaft 44c due to the horizontal hole 85c. 85e is an L shaped hole which supports the displacement shaft provided on the second linking member 86 and which guides the displacement shaft together with the sliding displacement of the lock plate 85.

In the second linking member 86, 86a is a rotation shaft which is inserted into the round hole formed on the left side plate of the chassis 32. 86b is a displacement shaft supported by the L shaped hole 85e formed on the lock plate 85. 86c is a gripping section which grips the third positional determination shaft 44c provided on the playing unit when the lock plate 85 slidingly displaces in direction B.

In the left side plate of the chassis 32, 32g is a round hole into which is inserted the rotation shaft 86a provided on the second linking member 86.

In this disk device, when the conveying unit base 74 rotates about the rotation shaft 74b due to the cam plate 81 slidingly displacing in the direction A–B, the displacement shaft 74c provided on the conveying unit base 74 displaces along the Z shaped hole 85b provided in the lock plate 85 and the lock plate 85 slidingly displaces in the direction A–B.

In this disk device, when the lock plate 85 slidingly displaces in the direction A–B due to the cam plate 81 slidingly displacing in the direction A–B, the displacement shaft 86b provided on the second linking member 86 displaces along the L shaped hole formed in the lock plate 85 and the second linking member 86 rotates about the rotation shaft 86. Furthermore when the lock plate 85 slidingly displaces in the direction B due to the cam plate 81 slidingly displacing in the direction B, the third positional determination shaft 44c is lightly held by the gripping section 86c of the second linking member 86 and the third positional determination shaft 44c is fixed into the horizontal hole 85c. On the other hand, when the lock plate 85 slidingly displaces in the direction A due to the cam plate 81 slidingly displacing in the direction A, the support of the third positional determination shaft 44c due to the horizontal hole 85c is released.

Figure 29:
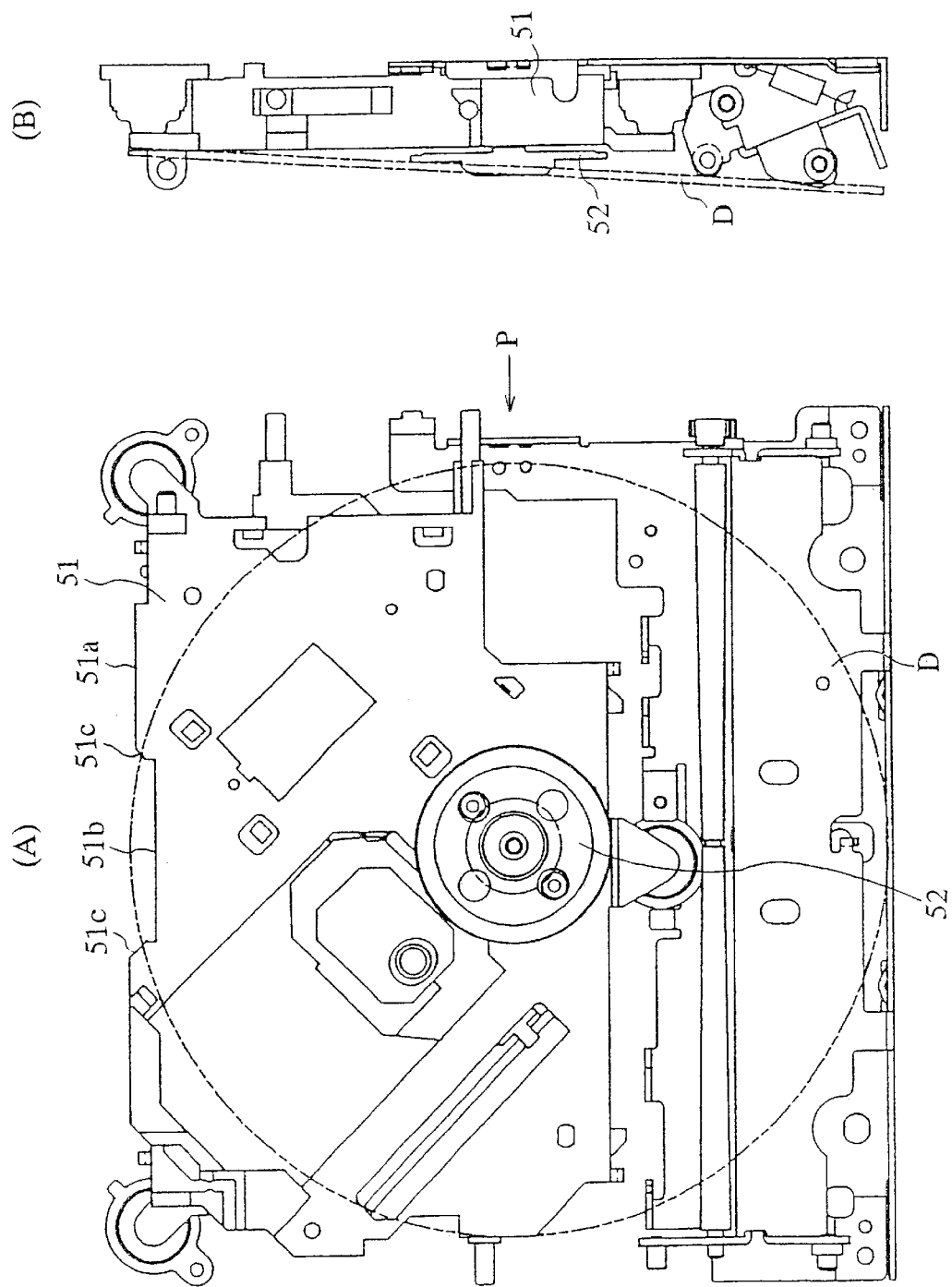
FIG. 29 shows a playing unit base in a disk device according to a first embodiment of the present invention. (A) shows the structure as seen from direction X in FIG. 1. (B) shows the structure as seen from direction P in (A).

FIG. 29 shows a playing unit base in a disk device according to a first embodiment of the present invention. FIG. 29(A) shows the playing unit base as seen from direction X in FIG. 1. FIG. 29(B) shows the playing unit base as seen from direction P in FIG. 29(A). FIG. 29 shows a 12 cm disk being raised from the turntable. In FIG. 29, the 12 cm disk D is shown by the broken line. In FIG. 29, 51a is an inner lateral face which is the face on the opposite side to the side of disk insertion of the playing unit base 51. 51b is a notch formed on the inner lateral face 51a of the playing unit base 51 so that the 12 cm disk D and the playing unit base 51 are in contact on the outer edge of the 12 cm disk. The notch has a trapezoidal shape when seen from above the playing unit base 51. 51c is the ridge of the notch 51b which is in contact with the 12 cm disk D and which corresponds with the sloped edge of the trapezoidal shaped notch 51b.

In this disk device, on the outer edge of the 12 cm disk D, a notch 51b is formed by machining the inner lateral face 51a of the playing unit base 51 so that the playing unit base 51 and the 12 cm disk D are in contact. By this arrangement, it is possible to prevent damage to the recording surface of the 12 cm disk D due to the fact that only the outer edge of the 12 cm disk D comes into contact with the playing unit base 51 when the 12 cm disk D is raised from the turntable.

In this disk device, the notch 51b is formed which has a trapezoidal shape when viewed from above the playing unit base 51. The sloping side of the trapezoidal shaped notch 51b adapted as the ridge 51c of the notch 51b which is in contact with the 12 cm disk D. As a result of this arrangement, the line of contact of the 12 cm disk D when contracting the playing unit base 51, and the ridge of the notch 51b are nearly vertical and hence there are few points of contact of the 12 cm disk D and the playing unit base 51.

Next the operation of the invention will be explained.
When the Disk is Inserted.

When a disk D is inserted from the disk insertion aperture 33 into the interior of the chassis 32, the insertion of the disk D is detected by a sensor, the third motor 76 is activated, the rotations of the third motor 76 are transmitted to the conveying roller 73 through the second gear 77, the reduction gears 78 and the first gear 75. As a result the conveying roller 73 rotates (refer to FIG. 19(A)).

When an 8 cm disk D is inserted from the disk insertion aperture 33 into the interior of the chassis 32, the 8 m disk D is tightly held by the conveying roller 73 and the protruding section 71a formed on the disk guiding section 71. The disk is then conveyed to the playing unit 41 by the rotations of the conveying roller 73.

During the step of conveying, first, the 8 cm disk D abuts with the abutting section 61a of the disk stopper 61. On being pushed by the 8 cm disk, the disk stopper 61 displaces in direction B. The lever stopper 62 rotates together with the displacement of the disk stopper 61 and in turn the slide lock 63 rotates together with the rotations of the lever stopper 62. The operational lever 82 slidingly displaces in direction A on being pushed by the pressure arm 63b of the slide lock 63 (refer to FIGS. 11 and 12).

When a 12 cm disk D is inserted from the disk insertion aperture 33 into the interior of the chassis 32, the 12 cm disk D is tightly held during initial and final conveying by the conveying roller 73 and the protruding section 71a formed on the disk guiding section 71. During conveying, the disk is held by the conveying roller 73 and the supplementary roller 72 mounted on the disk guiding section 71 and is conveyed to the playing unit 41 as a result of the rotations of the conveying roller 73 (refer to FIG. 16). When the 12 cm disk D is conveyed to the playing unit 41, the outer peripheral edge of the 12 cm disk D comes into contact with the ridge 51c of the notch 51b formed on the unit base 51 (refer to FIG. 29). In the step of conveying, firstly the 12 cm disk D abuts with the abutting pin 64a provided on the front arm 64. The front arm 64 rotates on being pushed by the 12 cm disk D. The slide lock 63 displaces when pushed by the pressure section 64 of the front arm 64. The regulating pin 63c which is placed in the first regulating section 62e detaches from the first regulating section 62e. With the regulating pin 63c in a detached state from the first regulating section 62e, the 12 cm disk D abuts with the abutting section 61a of the disk stopper 61. The disk stopper 61 displaces in direction B when pushed by the 12 cm disk D. At this time, the lever stopper 62 rotates together with the displacement of the disk stopper 61. When the disk stopper 61 has displaced to a degree in direction B, the front arm 64 returns to the original position and the regulating pin 63c enters the second regulating section 62f. When the disk stopper 61 displaces further in direction B, the lever stopper 62 rotates together with the rotations of the disk stopper 61 and the slide lock 63 rotates in response to the rotations of the lever stopper 62. Hence the operational lever 82 slidingly displaces in direction A on being pushed by the pressure arm 63b of the slide lock 63 (refer to FIGS. 13 and 14).

When the operational lever slidingly displaces in direction A, the rack 82b formed on the operational lever 82 meshes with the reduction gears 78. The operational lever 82 is pushed further in direction A by the motive force of the reduction gears 78 and the protruding section 82a formed on the operational lever 82 abuts with the indented section 81i formed on the cam plate 81. At this time, the first hooked projection 81k formed on the cam plate 81 and the second hooked projection 82c formed on the operational lever 82 connect. When the operational lever 82 slidingly displaces further in direction A, the protruding section 82a formed on the operational lever 82 pushes the indented section 81i formed on the cam plate 81 and the cam plate 81 slidingly displaces in direction A together with the displacement of the operational lever 82 (refer to FIGS. 20–24).

When the cam plate 81 slidingly displaces to direction A, the displacement shaft 83a provided on the first linking member 82 displaces along the Z shaped hole formed in the right side plate of the chassis 32 and the first linking member 82 rotates about the rotation shaft 81g of the first linking member 82 provided on the cam plate 81. As a result the support of the first positional determination shaft 44a due to the horizontal hole 81c and the support of the second positional determination shaft 44b due to the horizontal groove 51d are released (refer to FIGS. 20–22).

When the cam plate 81 slidingly displaces in direction A, the displacement shaft 74c provided on the conveying unit base 74 displaces along the Z shaped hole 81b formed in the cam plate 81 and the conveying unit base 74 rotates about the rotation shaft 74b. The conveying roller 74 displaces in the direction in which the disk D is not tightly held by the convening roller 74 and the disk guiding section 71. At this time, the first gear 75 detaches from the reduction gears 78 and the rotations of the third motor 76 are no longer transmitted to the conveying roller 73 (Refer to FIG. 19(B) and FIGS. 20–22). At this time the displacement shaft 74c which is provided on the conveying unit base 74 displaces along the Z shaped hole 85b provided in the lock plate 85 and the lock plate 85 slidingly displaces in direction A. The displacement shaft 86b which is provided on the second linking member 86 displaces along the L shaped hole 85e provided in the lock plate 85 and the second linking member 86 rotates about the rotation shaft 86a. Thus the support of the third positional determination section 44c due to the horizontal hole 85c is released (Refer to FIGS. 27 and 28).

When the cam plate 81 slidingly displaces in direction A, due to the force of the fifth spring 60 the pressure arm 54 depresses as a result of the right side bent section 54e provided on the pressure arm 54 depressing along the slope of the inclination section 81h provided in the cam plate 81 (Refer to FIGS. 11–14), and a disk D is tightly held by the disk gripping body 55 and the turntable 52 and is placed on the turntable 52. At this time, the disk conveying completion switch is pushed by the pressure arm 54 and the third motor 76 is shut down.

When a Disk is played

When the playing of the disk D is initiated with the disk placed in a set position on the turntable 52, the first motor 53 is activated, the turntable 52 is rotated and the disk D is rotated. Furthermore when the second motor 58 is activated, the rotations of the second motor 58 are transmitted to the guide shaft 57b through the braking mechanism 59 and the guide shaft 57b is rotated. The pickup 56 is transferred along the guide which is the combination of the guide groove 57a and the guide shaft 57b and the information recorded on the disk D is read.

When the Disk is Expelled

When the playing of the disk is completed and disk expulsion is commenced with the disk D tightly held in a set position by the turntable 52 and the disk gripping body 55, and the reduction gears 78 rotating in the inverse direction. The operational lever 82 slidingly displaces in direction B and the second hooked projection 82c formed on the operational lever 82 pushes the first hooked projection 81k formed on the cam plate 81 and the cam plate 81 slidingly displaces in direction B together with the sliding displacement of the operational lever 82. The operational lever 82 further displaces in direction B due to the motive force of the reduction gears 78. The cam plate which slidingly displaces together with the sliding displacement of the operational lever 82 comes into contact with the control hook 32e formed on the right side plate of the chassis 32 and returns to the original position (Refer to FIG. 21, FIG. 22, FIG. 24 and FIG. 25).

When the cam plate 81 slidingly displaces in direction B, the displacement shaft 83a provided on the first linking member 82 displaces along the Z shaped hole 32c formed in the right side plate of the chassis 32 and the first linking member 82 rotates about the rotation shaft 81g of the first linking member 82 provided on the cam plate 81. The first positional determination shaft 44a is held by the gripping section 83c of the first linking member 83 and is fixed in the horizontal hole 81c. The second positional determination shaft 44b is fixed in the horizontal groove 81d (refer to FIGS. 21 and 22).

When the cam plate 81 slidingly displaces in direction B, the displacement shaft 74c provided on the conveying unit base 74 displaces along the Z shaped hole 81b formed in the cam plate 81 and the conveying unit base 74 rotates about the rotation shaft 74b. The conveying roller 74 displaces in the direction in which the disk D is tightly held by the conveying roller 74 and the disk guiding section 71. At this time, the first gear 75 and the reduction gears 78 mesh and the rotations of the third motor 76 are transmitted to the conveying roller 73 through the second gear 77, the reduction gears 78 and the first gear 75. Hence the conveying roller 73 rotates (refer to FIGS. 19)(A), 21 and 22). At this time the displacement shaft 74c which is provided on the conveying unit base 74 displaces along the Z shaped hole 85b provided in the lock plate 85 and the lock plate 85 displaces in direction B. At this time, the displacement shaft 86b which is provided on the second linking member 86 displaces along the L shaped hole 85e provided in the lock plate 85 and the second linking member 86 rotates about the rotation shaft 86a. The third positional determination shaft 44c is tightly held by the gripping section 86c of the second linking member 86 and the third positional determination shaft 44c is fixed in the horizontal hole 85c (refer to FIGS. 27 and 28).

When the cam plate 81 slidingly displaces in direction B, the pressure arm 54 rises and lifts the disk D from the turntable 52 as the right hand side bent section 54e provided on the pressure arm 54 rises along the incline of the inclined section 81h provided on the cam plate 81 (refer to FIGS. 11–14).

When the cam plate 81 contacts the control hook 32e formed on the right side plate of the chassis 32, only the operational lever 82 displaces in direction B due to the motive force of the reduction gears 78. As a result, the first hooked shaped projection 81k formed on the cam plate 81 and the second hooked shaped projection 82c formed on the operational lever 82 separate. Then the operational lever 82 is drawn in direction B by the force of the fourth spring 84 and returns to the initial position (refer to FIGS. 20 and 23).

When an 8 cm disk D is expelled, the operational lever 82 returns to its initial position and the slide lock 62 rotates in the inverse direction to that when a disk is inserted and returns to the initial position. Then the lever stopper 62 rotates inversely together with the rotations of the slide lock 62, the disk stopper 61 displaces in direction A together with the rotations of the lever stopper 62 and returns to its original position. When the disk stopper 61 displaces in direction A, the 8 cm disk D is tightly held between the protruding section 71a formed on the disk guiding part 71 and the conveying roller 73. The disk is conveyed to the disk insertion aperture 33 by the rotations of the conveying roller 73 and is expelled to the outside of the chassis 32. Furthermore when the disk stopper 61 displaces in direction A and returns to the original position, the engaging section 61b provided on the disk stopper 61 abuts with the support member 65. The engaging section 61b pressures the support member 65 due to the force of the first spring 66 connected to the lever stopper 62 and the slide lock 63 (refer to FIGS. 11 and 12).

When a 12 cm disk D is expelled and the operational lever 82 returns to its original position, the slide lock 62 rotates in the inverse direction to when a disk is inserted and returns to its original position. Then the lever stopper 62 rotates inversely together with the rotations of the slide lock 62 and the disk stopper 61 displaces in direction A together with the rotations of the lever stopper 62. When the disk stopper 61 displaces in direction A, at the commencement and completion of conveying, the 12 cm disk D is tightly held between the protruding section 71a formed on the disk guiding section 71 and the conveying roller 73. While conveying is in progress, it is held tightly between the supplementary roller 72 mounted on the disk guiding section 71 and the conveying roller 73. The disk is conveyed to the disk insertion aperture 33 by the rotations of the conveying roller 73 and is expelled outside the chassis 32 (refer to FIG. 16). When the disk stopper 61 displaces in direction A, firstly the 12 cm disk D abuts with the abutting pin 64a provided on the front arm 64, is pushed by the 12 cm disk D and the front arm 64 rotates. The slide lock 63 displaces by being pushed by the pressing section 64b of the front arm 64 and the regulating pin 63c placed on the second regulating section 62f detaches from the second regulating section 62f. While the regulating pin 63c is detached from the second regulating section 62f, the lever stopper 62 rotates in the inverts direction to when a disk is inserted due to the force of the first spring 66 which is connected to the lever stopper 62 and the slide lock 63. Then the disk stopper 61 displaces in direction A and returns to its original position together with the rotations of the lever stopper 62. Further, when the disk stopper 61 returns to the original position, the front arm returns to its original position and the regulating pin 63c enters the first regulating section 62e. Further, when the disk stopper 61 returns to its original position, the engaging section 61b provided on the disk stopper 61 abuts with the support member 65 and the engaging section 61b pushes against the support member 65 due to the force of the first spring 66 which is connected to the lever stopper 62 and the slide lock 63.

As explained above, according to embodiment 1, when a disk is not inserted, since the engaging section 61b provided on the disk stopper 61 is adapted so as to abut with and push against the support member 65, the disk stopper 61 does not wobble and unwanted noises can be prevented when a disk is not inserted into the interior of the chassis 32.

Furthermore according to embodiment 1, since the supplementary roller 72 is placed on the end of the disk guiding section 71 so that the outer face 72c of the cylindrical section 72b of the supplementary roller 72 is placed on the conveying roller 73 side by the protruding section 71a formed on the disk guiding section 71, during conveying of a 12 cm disk, the disk D is tightly held by the supplementary roller 72 mounted on the disk guiding section 71 and the conveying roller 73. As a result, while the 12 cm disk is being conveyed, since the force acting on the 12 cm disk in the direction opposite to that in which it is being conveyed is reduced, it is possible to convey the disk smoothly and prevent obstacles to the insertion or expulsion of the 12 cm disk.

Furthermore according to embodiment 1, since the rotation shaft 72a of the supplementary roller 72 is adapted so that it is pushed in the axial direction by the blade spring section 71b formed on the disk guiding section 71, the supplementary roller 72 is does not wobble and unwanted noises can be prevented.

According to embodiment 1, since the rotation shaft 72*a* of the supplementary roller 72 faces the horizontal direction, the outer face 72*c* of the cylindrical section 72*b* of the supplementary roller 72 faces the end of the disk guiding section 71 and moves into proximity with the conveying roller 73. As a result, while the 12 cm disk is being conveyed, only the outer edge of the 12 cm disk comes into contact with the supplementary roller 72 and damage to the recording face of the 12 cm disk by the supplementary roller 72 can be prevented.

Furthermore according to embodiment 1, a first hooked projection is formed on the top of the cam plate 81 and a second hooked projection 82*c* is formed on the operational lever 82 which connects with the first hooked projection 81*k* when the operational lever 82 slidingly displaces in the direction of disk expulsion and the protruding section 82*a* formed on the operational lever 82 abuts with the indented section 81*i* formed on the upper section of the cam plate 81 and which detaches from a position of attachment with the first hooked projection 81*k* when the operational lever 82 slidingly displaces in a direction of disk insertion. Hence it is possible for the operational lever 81 and the cam plate 82 to return to their original position and to prevent any impediment to the disk being expelled to the outside of the chassis 32.

Thus according to embodiment 1, as an aperture 32*f* is formed in the right side plate of the chassis 32, it is easy to connect and detach the first hooked projection 81*k* and the second hooked projection 82*c* by bending the first hooked projection 81*k* from positions of both connection and detachment of the first hooked projection 81*k* formed on the cam plate 81 and the second hooked projection 82*c* formed on the operational lever 82.

Furthermore according to embodiment 1, when the 12 cm disk is raised from the turntable 52, the inner lateral face 51*a* of the playing unit base is machined and a notch 51*b* is formed so that the 12 cm disk and the playing unit base 51 come into contact on the outer edge of the 12 cm disk. Thus when the disk is raised from the turntable 52 only the outer edge of the 12 cm disk contacts the playing unit base 51 and it is possible to prevent damage to the recorded surface of the 12 cm disk.

Furthermore according to embodiment 1, since a notch 51*b* is formed in a trapezoidal shape when the playing unit base is viewed from the upper side, it is possible to reduce the number of contact points between the 12 cm disk and the playing unit base 51 as the contact line of the 12 cm disk and the ridge 51*c* of the notch 51*b* are almost vertical when the 12 cm disk is contacting with the playing unit base. Thus there are few points of contact between the 12 cm disk and the playing unit base.

Embodiment 2

Embodiment 2 differs from embodiment 1 only in the construction of the supplementary roller and the mounting of the supplementary roller on the disk guiding section.

Figure 30:
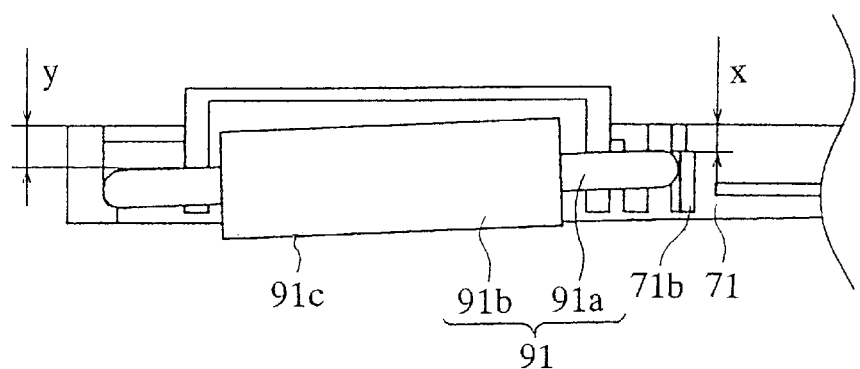
FIG. 30 shows a disk guide section and supplementary roller in a disk device according to a second embodiment of the present invention.

FIG. 30 shows the supplementary roller and the disk guiding section in a disk device according to a third aspect of the present invention. FIG. 30 shows the construction according to FIG. 17(C) in the first aspect of the embodiment. In FIG. 30, 91 is a supplementary roller placed on the end of the disk guiding section 71 so that the outer face of the cylindrical shaped section is placed on the conveying roller side by the protruding section formed on the disk guiding section 71. 91*a* is a rotation shaft of the supplementary roller 91 which is mounted on the disk guiding section 71 so that it faces the end of the disk guiding section 71 and moves into proximity with the conveying roller. In other words, in FIG. 30, the rotation shaft 91*a* of the supplementary roller 91 is mounted on the disk guiding section 71 so that x<y. 91*b* is a cylindrical section (rotation section) of the supplementary roller 91. 91*c* is an outer face of the cylindrical section 91*b*.

In this disk device, the rotation shaft 91*a* of the supplementary roller 91 is mounted on the disk guiding section 71 so as to face the end of the disk guiding section 71 and move into proximity with the conveying roller. As a result, the outer face 91*c* of the cylindrical section 91*b* of the supplementary roller 91 is adapted to face the end of the disk guiding section 71 and move into proximity with the conveying roller. The protruding section formed on the disk guiding section 71 is formed to face the end form the center and move towards the conveying roller. As a result, when the disk D is being conveyed, the disk D is adapted so that only the outer edge of the disk D contacts with the supplementary roller 91 or the protruding section formed on the disk guiding section 71. As a result of this arrangement, the recording surface of the disk D is prevented from being damaged by the supplementary roller 91 or the protruding section formed on the disk guiding section.

As explained above, according to the second embodiment, the outer face of the cylindrical shaped section 91*b* of the supplementary roller 91 is adapted to be placed on the conveying roller 73 side by the protruding section 71*a* formed on the disk guiding section 71. Hence during conveying of the 12 cm disk, the disk D is tightly held by the conveying roller 73 and the supplementary roller 79 mounted on the disk guiding section 71. As a result, when the 12 cm disk is being conveyed, since the force acting on the 12 cm disk in the direction opposite to that in which the disk is being conveyed is reduced, it is possible to convey the 12 cm disk smoothly and to prevent any impediment to the insertion or expulsion of the 12 cm disk.

Furthermore according to the second embodiment, the rotation shaft of the supplementary roller 91 is adapted to face the end of the disk guiding section 71 and move towards the conveying roller. Hence the outer face 91*c* of the cylindrically shaped section 91*b* of the supplementary roller 91 faces the end of the disk guiding section 71 and moves toward the conveying roller 73. As a result, when the 12 cm disk is being conveyed, since only the outer edge of the 12 cm disk comes into contact with the supplementary roller 91, the recording surface of the 12 cm disk can be stopped by the supplementary roller 91.

INDUSTRIAL APPLICABILITY

As shown above, the disk device of the present invention is adapted for use as a disk device in an automobile and is capable of inserting two disks of different sizes.

What is claimed is:

1. A disk device comprising:

a chassis;

a conveying unit, said conveying until being mounted in the interior of the chassis and further including a conveying roller and a disk guiding section having a protruding section formed so as to move towards the conveying roller as said disk guiding section moves to the end from the center in an approximately vertical position to the direction in which a disk is conveyed, wherein said conveying roller displaces in a direction such that said disk is tightly held by said disk guiding section and said conveying roller and said disk is conveyed by the rotations of said conveying roller while tightly held, and wherein said conveying unit further comprises a supplementary roller to engage a circumferential edge of said disk, said supplementary roller having a rotation shaft and a rotation section and disposed in front of or behind said guiding section, said rotation shaft being mounted on said disk guiding section so as to face the direction in which the disk is being conveyed in an approximately vertical direction and an outer face of said rotation section being disposed on an end of said disk guiding section so as to be placed on said conveying roller side by said protruding section; and a second supplementary roller, wherein the supplementary roller and the second supplementary roller are located at opposite sides of the chassis.

2. A disk device according to claim 1 wherein said disk guiding section comprises a blade spring section which pressures the rotation shaft of the supplementary roller in the axial direction.

3. A disk device according to claim 1 wherein said supplementary roller is disposed so as to displace toward the conveying roller as the outer race of the rotation section moves towards the end from the center.

4. A disk device according to claim 1, wherein said rotation shaft of the supplementary roller is generally tilted relative to the axis of the conveying roller.

5. The disk device of claim 1, wherein said disk is selected from a group comprising disks having a plurality of widths, and wherein said supplementary roller engages a selected disk having a width of about twelve centimeters.

6. A disk conveying device comprising:

a chassis:

a conveying unit mounted on the chassis, the conveying unit further including a conveying roller and a disk guiding section configured to move towards the conveying roller in approximately a disk conveying direction, the conveying roller configured to displace in a direction such that a disk is tightly held between the disk guiding section and the conveying roller;

a supplementary roller to engage a circumferential edge of said disk, said supplementary roller including a rotation shaft and a rotation section, and disposed in front of or behind said guiding section, the rotation shaft being mounted on the disk guiding section so as to face the disk conveying direction, a surface of the rotation section being tapered such that a first end of the surface is placed farther toward the conveying roller than a second end of the surface, the rotation section being disposed on the disk guiding section such that the rotation shaft of the supplementary roller is generally parallel with the axis of the conveying roller; and a second supplementary roller, wherein the supplementary roller and the second supplementary roller are located at opposite sides of the chassis.

7. The disk conveying device of claim 6, wherein said disk is selected from a group comprising disks having a plurality of widths, and wherein said supplementary roller engages a selected disk having a width of about twelve centimeters.

8. A method for conveying a disk in a disk conveying device comprising:

placing a disk in proximity with a conveying roller and a disk guiding section configured to move towards the conveying roller in approximately a disk conveying direction, the conveying roller configured to displace in a direction such that the disk is tightly held between the disk guiding section and the conveying roller; and placing the disk in proximity with a supplementary roller including a rotation shaft and a rotation section, and disposed in front of or behind said guiding section, such that a circumferential edge of said disk engages said supplementary roller, the rotation shaft being mounted on the disk guiding section so as to face the disk conveying direction, a surface of the rotation section being tapered such that a first end of the surface is placed farther toward the conveying roller than a second end of the surface, the rotation section being disposed on the disk guiding section such that the rotation shaft of the supplementary roller is generally parallel with the axis of the conveying roller; and wherein a second supplementary roller is provided and wherein the second supplementary roller and the supplementary roller are located at opposite sides of a chassis.

9. The method of claim 8, further comprising determining a width of said disk to be about twelve centimeters.

* * * * *